US012809924B2

(12) United States Patent
Bondarionok et al.

(10) Patent No.: US 12,809,924 B2
(45) Date of Patent: Nov. 24, 2026

(54) COMPREHENSIVE INDEX GENERATION FROM RARE TERMS

(71) Applicant: Microsoft Technology Licensing, LLC, Redmond, WA (US)

(72) Inventors: Aliaksei Bondarionok, Redmond, WA (US); Padma Priya Gaggara, Redmond, WA (US); Wenjie Gu, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/949,850

(22) Filed: Nov. 15, 2024

(65) Prior Publication Data

US 2026/0141004 A1 May 21, 2026

(51) Int. Cl.

| | |
|---|---|
| ***G06F 16/00*** | (2019.01) |
| ***G06F 16/951*** | (2019.01) |
| ***G06F 16/953*** | (2019.01) |
| ***G06F 16/955*** | (2019.01) |

(52) U.S. Cl.

CPC .......... *G06F 16/951* (2019.01); *G06F 16/953* (2019.01); *G06F 16/9566* (2019.01)

(58) Field of Classification Search

CPC ................. G06F 16/951; G06F 16/953; G06F 16/9566

See application file for complete search history.

(56) References Cited

U.S. PATENT DOCUMENTS

| | | | | |
|---|---|---|---|---|
| 6,631,496 | B1 | 10/2003 | Li et al. | |
| 6,804,700 | B1 | 10/2004 | Terek | |
| 7,627,613 | B1 | 12/2009 | Dulitz | |
| 8,078,625 | B1 * | 12/2011 | Zhang | G06F 16/353 707/952 |
| 8,645,367 | B1 | 2/2014 | Hajaj et al. | |
| 9,239,881 | B2 | 1/2016 | Wang et al. | |
| 9,355,177 | B2 * | 5/2016 | Brawer | G06F 16/951 |
| 9,754,028 | B2 | 9/2017 | Brake | |
| 10,949,476 | B1 | 3/2021 | Ferguson | |
| 11,533,283 | B1 | 12/2022 | Maalouf | |

(Continued)

OTHER PUBLICATIONS

"Search engine indexing—Wikipedia", Retrieved from Internet URL: https://en.wikipedia.org/w/index.phptitle=Search_engine_indexing&oldid=12470419 54, Sep. 22, 2024, 12 pages.

(Continued)

*Primary Examiner* — Cheryl Lewis

(74) *Attorney, Agent, or Firm* — Shook, Hardy & Bacon L.L.P.

(57) ABSTRACT

Technology is disclosed for generating a comprehensive or large index. In an example embodiment, the Internet is crawled to collect URLs corresponding to webpage addresses, and infrequent or rare terms are extracted from the URL, anchor text, or title of a webpage. An index is populated that maps these rare terms to URLs, enabling fast lookups during search queries. In some instances, common terms are also extracted and used to populate an index associating common terms with URLs. When a query is received, the comprehensive or large index is used to retrieve URLs relevant to both niche and mainstream content causing a balanced integration of specialized and popular results within the search output.

20 Claims, 10 Drawing Sheets

(56) References Cited

U.S. PATENT DOCUMENTS

| | | | | |
|---|---|---|---|---|
| 12,038,993 | B1 | 7/2024 | Agarwal | |
| 12,362,945 | B1 | 7/2025 | Novales Gomez | |
| 12,368,802 | B1 | 7/2025 | Koul | |
| 2002/0065671 | A1 | 5/2002 | Goerz, Jr. | |
| 2003/0014415 | A1 | 1/2003 | Weiss et al. | |
| 2005/0177595 | A1 | 8/2005 | Krieg | |
| 2007/0208713 | A1 | 9/2007 | Krishnaprasad et al. | |
| 2007/0208714 | A1 | 9/2007 | Ture et al. | |
| 2007/0244857 | A1 | 10/2007 | Yu | |
| 2008/0040389 | A1 | 2/2008 | Seth | |
| 2009/0019354 | A1 | 1/2009 | Jaiswal et al. | |
| 2010/0198857 | A1* | 8/2010 | Metzler | G06Q 30/02 705/14.54 |
| 2011/0087647 | A1* | 4/2011 | Signorini | G06F 16/951 707/711 |
| 2011/0161260 | A1 | 6/2011 | Burges et al. | |
| 2011/0167054 | A1* | 7/2011 | Bailey | G06F 16/9566 707/E17.108 |
| 2011/0208730 | A1 | 8/2011 | Jiang et al. | |
| 2011/0307436 | A1 | 12/2011 | Cai | |
| 2012/0054598 | A1 | 3/2012 | Lin et al. | |
| 2012/0323881 | A1 | 12/2012 | Liu | |
| 2013/0091115 | A1* | 4/2013 | Brake | G06F 16/951 707/E17.108 |
| 2013/0091166 | A1* | 4/2013 | Stiffelman | G06F 16/9537 707/769 |
| 2016/0321252 | A1 | 11/2016 | Zhu | |
| 2017/0067748 | A1 | 3/2017 | Glover et al. | |
| 2018/0246899 | A1 | 8/2018 | Natchu et al. | |
| 2018/0357326 | A1 | 12/2018 | Lepeska | |
| 2019/0197063 | A1 | 6/2019 | Sekar et al. | |
| 2021/0028998 | A1 | 1/2021 | Khetarpal | |
| 2021/0397659 | A1 | 12/2021 | Chang | |
| 2022/0038424 | A1* | 2/2022 | Liu | H04L 63/0236 |
| 2022/0350686 | A1 | 11/2022 | Azaria | |
| 2024/0020538 | A1 | 1/2024 | Socher | |
| 2024/0256623 | A1 | 8/2024 | Rayit | |
| 2024/0265420 | A1 | 8/2024 | Glazier | |
| 2025/0077558 | A1 | 3/2025 | Zhang | |
| 2025/0094521 | A1 | 3/2025 | Carbune | |
| 2025/0103666 | A1 | 3/2025 | Li | |
| 2025/0148024 | A1 | 5/2025 | Ono | |
| 2025/0200123 | A1 | 6/2025 | Soni | |
| 2025/0225163 | A1 | 7/2025 | Olson | |
| 2025/0245270 | A1 | 7/2025 | Yushkina | |
| 2025/0245371 | A1 | 7/2025 | Zalasky | |
| 2025/0252271 | A1 | 8/2025 | Weisz | |
| 2025/0298851 | A1 | 9/2025 | Shriram | |
| 2025/0335520 | A1 | 10/2025 | Jing | |
| 2025/0335530 | A1 | 10/2025 | Jing | |
| 2025/0350614 | A1* | 11/2025 | Bellary Seetharam | H04L 63/1425 |
| 2025/0378118 | A1 | 12/2025 | Alonichau | |
| 2026/0081844 | A1 | 3/2026 | Feng | |
| 2026/0141013 | A1 | 5/2026 | Bondarionok | |

OTHER PUBLICATIONS

International Search Report and Written Opinion received for PCT Application No. PCT/US2025/037995, mailed on Nov. 28, 2025, 15 pages.

International Search Report and Written Opinion received for PCT Application No. PCT/US2025/037996, Nov. 18, 2025, 13 pages.

Khan et al., "Implementation of a Search Engine Using Web Crawling and Indexing", IEEE, 2024 International Conference on Advances in Computing Research on Science Engineering and Technology (ACROSET), 2024, 8 pages.

Non-Final Office Action mailed on Dec. 19, 2025, in U.S. Appl. No. 18/949,888, 40 pages.

Zhu, et al., "Large Language Models for Information Retrieval: A Survey", In Repository of arXiv:2308.07107v4, Sep. 4, 2024, 35 pages.

Final Office Action mailed on Sep. 4, 2026, in U.S. Appl. No. 18/949,888, 48 Pages.

* cited by examiner

COMPREHENSIVE INDEX GENERATION FROM RARE TERMS

BACKGROUND

Classic search engine technologies operate by first crawling the web to discover content, then indexing that content in a structured database in preparation to execute a future query. Subsequently, when a user submits a query, the search engine processes it to understand the intent, retrieves relevant documents from the previously-generated index, ranks them based on relevance, and displays them on a search engine results page (SERP).

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Various embodiments discussed herein are directed to dynamically creating and/or validating new Uniform Resource Locators (URLs) based on a user's query and contextual data (such as user location data and marketing data). For example, new URLs can be directly generated by a Large Language Model (LLM) and/or generated based on using known URL patterns. Known URL patterns are predefined templates, such as https://www.microsoft.com/en-us/search/explore?q=###QUERY##, or it can be regular URLs like https://www.microsoft.com/en-us/surface/which link to other web pages, which may have updates and news relevant to semantically similar queries (for example "surface laptop"). This enables the discovery of relevant content that may not be pre-existing in the search engine's index. This process enhances the search engine's ability to deliver the most current and relevant results by generating potential content sources in real-time, validating them against known URL patterns, and/or incorporating the discovered content into the index for immediate query execution. For example, after a user issues a query, various embodiments generate a URL. In some embodiments, this URL is validated against a collection of templates or patterns that define the typical structure of URLs for specific domains or types of resources. These patterns ensure that URL candidates conform to known structures that are likely to lead to relevant content. Various embodiments then retrieve the content relevant to the query, and index the content. The user receives search results that include the newly discovered content or up-to-date information that is relevant to the query.

Various embodiments are additionally or alternatively directed to a process that involves iteratively discovering, crawling, and indexing new content by following links from seed URLs (for example URLs generated by the LLM as described above), which may be either pre-existing or newly generated. This process deepens the search engine's index by continuously exploring outlinks (such as a hyperlink on a web page that points to another web page), fetching new content, and updating the index in real-time. By iterating through multiple levels of linked content, this process ensures that the search engine captures a broader and richer set of information related to the user's query. For example, responsive to a query, some embodiments start crawling from a first seed URL. During the crawl, some embodiments detect and follow a linked second URL, such as a hyperlink on a web page that points to another web page on a different website. Some embodiments then fetch and index the content from this new URL. The search results are enriched with newly discovered, in-depth information relevant to the query, providing the user with a comprehensive view of the topic.

Various embodiments are additionally or alternatively directed to an organic process that collects a vast number of actual URLs (such as 10 trillion). The organic process extracts terms from the URLs, anchor texts, and/or titles, focusing on infrequent and rare terms to improve recall for niche queries. The organic process then builds an index, such as an inverted index mapping terms to URLs.

In light of various search engine technologies, various embodiments have the technical effect of at least reduced error rate, reduced computing consumption (for example, memory, I/O, latency, bandwidth), enhanced reliability, and/or simplifying the software development process, as described in more detail below.

BRIEF DESCRIPTION OF THE DRAWINGS

The present invention is described in detail below with reference to the attached drawing figures, wherein.

DETAILED DESCRIPTION

Figure 1:
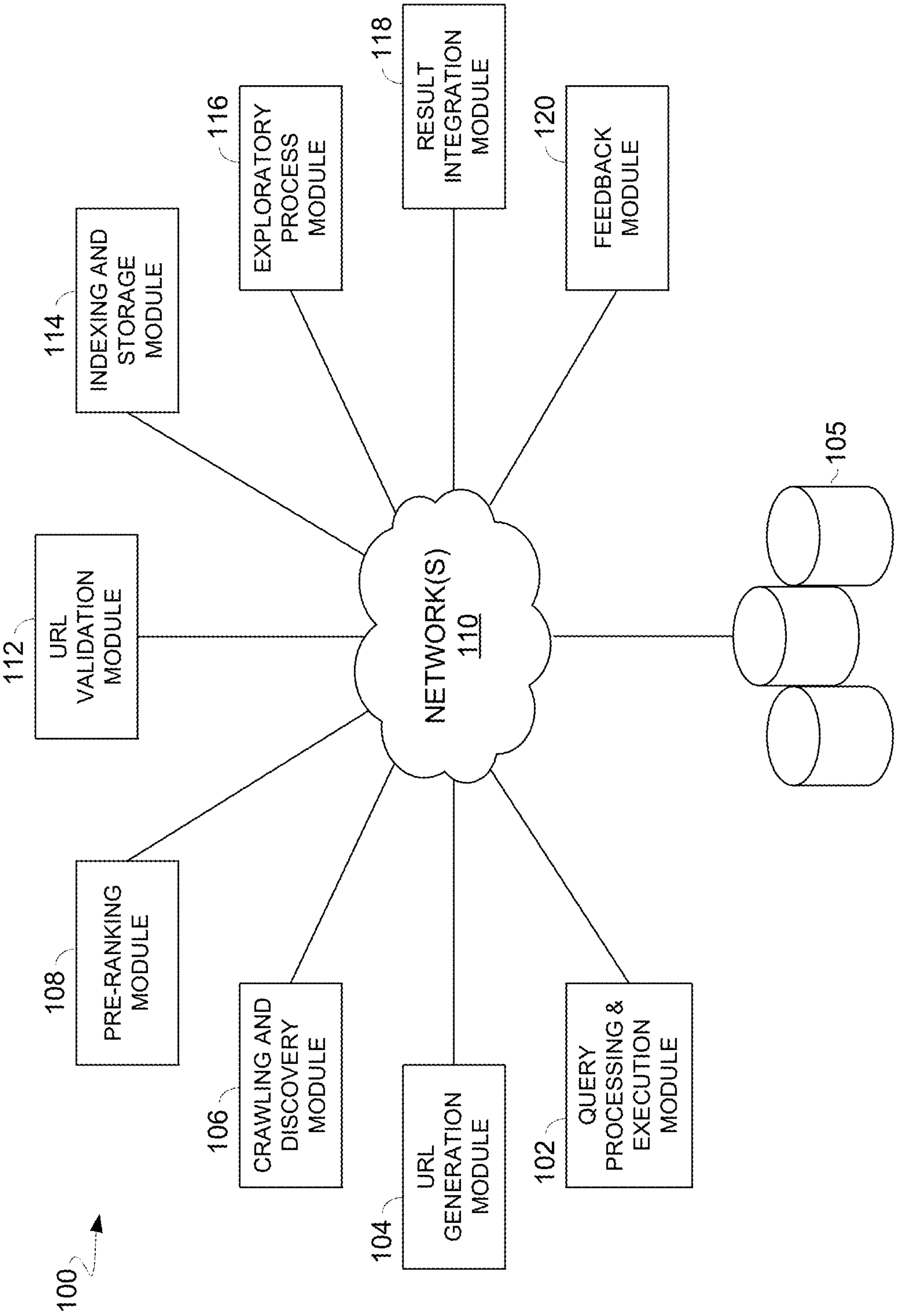
FIG. 1 is a block diagram depicting an example computing system architecture suitable for implementing some embodiments of the disclosure.

The subject matter of aspects of the present disclosure is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described. Each method described herein may comprise a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a stand-alone application, a service or hosted service (stand-alone or in combination with another hosted service), or a plug-in to another product, to name a few.

As described above, classic search engine technologies operate by first crawling the web to discover content, then indexing that content in a structured database before a query is issued. After a query is issued, to execute the query, these technologies then retrieve and rank relevant documents from the index. In an example, crawling is the process by which search engines explore the web to find new and updated content. This is typically done using automated programs known as "web crawlers" or "spiders." The search engine typically begins with a list of known web pages, known as "seeds." The crawler visits these pages, extracts links to other pages, and follows them. This process continues recursively, allowing the search engine to discover new content.

In an example, indexing is a process that involves processing the data collected by crawlers and storing it in a way that makes it easy to retrieve. The content of each crawled page is analyzed. Text is extracted, and the relevance of the content is assessed based on factors like keyword density, meta tags, headings, and more. The search engine thus creates an index, which is, in some instances, a large database that stores the information in a structured format. This index allows the search engine to quickly find relevant documents for any given query. When a query is issued, the search engine calculates a relevance score for each document in its index based on factors like keyword match, page authority, user engagement metrics, and more. These scores are then used by complex ranking algorithms to determine the order in which results should be presented.

There are several technical problems with these classic search engine technologies. For example, search engines generally update their indices at regular intervals (for example weekly), which often results in outdated content being served, especially for rapidly evolving topics or trends. Consequently, search results are inaccurate and associated with a high error rate because users miss the latest information, leading to decreased relevance of search results. Although some existing search engines have "fresh" incremental pipelines to get content like news, blogs, into index quickly, these are typically separate in-memory indexes, which are 10,000 times more expensive than classic indexes. Another limitation for getting all content indexed is crawl bandwidth both on search engines side (especially for sites with large number of web pages), or on the website side (often limited by robots protocol). One more problem in the classic approach for getting fresh content is "discovering" such new URLS on time: with high cost of fresh indexing, and the system trying to be predictive of future user needs, there is some suboptimality that some of the good documents are not discovered or selected into index, or it is taking time.

Another technical problem is that due to the reliance on scheduled crawls and batch processing, traditional search engines typically introduce significant computing network latency in making fresh content available in search results. This delay can be particularly problematic for time-sensitive queries. Consequently, users will experience delays in accessing the most recent content, which is critical for queries about breaking news, trends, or newly published research.

Another related technical problem is that existing search engines perform full-web crawling. Full web crawling refers to the process by which a search engine systematically browses the entire World Wide Web (or as much of it as possible) to collect indexed web pages. Full-web crawling is computing resource-intensive, requiring substantial processing power, memory, and network bandwidth. This approach is not always efficient, particularly when the goal is to update only a subset of the web relevant to specific queries. This leads to high operational costs and inefficiencies, as much of the crawled data may not be immediately relevant to the current search demands.

Various embodiments employ various technical solutions that have technical effects in light of these technical problems. In operation, various embodiments employ a generative process by dynamically generating and validating new URLs (for example via a Large Language Model (LLM) and/or URL templates) based on a user's query and contextual data (for example user location data and marketing data), enabling the discovery of relevant content that may not be pre-existing in the search engine's index. This process enhances the search engine's ability to deliver the most current and relevant results by generating potential content sources in real-time, validating them against known patterns, and incorporating the discovered content into the index for immediate query execution. For example, a user searches for "AI-driven renewable energy forecasts for 2024." Various embodiments generate a URL such as https://www.energy-forecast.com/ai/2024?search=renewable+energy. In some embodiments, this URL is validated against a pattern database and is found to be relevant. One purpose of this URL construction is to retrieve more pages by crawling it. The URL itself can also be used as a search result. In an example, a "pattern database" in the context of URL generation and validation is a collection of templates or patterns that define the structure of URLs for specific domains or types of resources. These patterns are used to generate and validate URLs, ensuring they conform to known structures that are likely to lead to relevant content. Various embodiments then access the generated URL, retrieve the content about AI-driven forecasts in renewable energy, and index it. The user receives search results that include the newly discovered content, providing up-to-date information on renewable energy forecasts powered by AI.

Various embodiments are additionally or alternatively directed to a process that involves iteratively discovering, crawling, and indexing new content by following links from seed URLs, which may be either pre-existing or generated. In some embodiments, such seeds are generated from generative process (for example using an LLM). Alternatively or additionally, seeds are the search result URLs already returned by a search engine. This process deepens the search engine's index by continuously exploring outlinks, fetching new content, and updating the index in real-time. By iterating through multiple levels of linked content, this process ensures that the search engine captures a broader and richer set of information related to the user's query. For example, some embodiments start crawling from a seed URL, such as https://www.healthcareinnovations.com/ai-diagnostics. In addition to seeds from the generative process (such as those generated by an LLM), a source of seeds for the process are the search result URLs already returned by a search engine (such as by classic methods). During the crawl, some embodiments detect and follow a linked URL, https://www.healthcareinnovations.com/ai-diagnostics/2024. Some embodiments then fetch and index the content from this new URL, which includes detailed reports on upcoming AI diagnostic tools. The search results are enriched with newly discovered, in-depth information about the latest innovations in AI for healthcare diagnostics, providing the user with a comprehensive view of the topic.

One technical effect is reduced error rate based on the technical solution of real-time crawling. Various embodiments perform real-time crawling that starts from seed URLs (which could be known high-quality sources or dynamically generated URLs from the generative process). This allows the search engine to discover and refresh content dynamically, as it is published or updated on the web. Consequently, updated and thus accurate information is surfaced, thereby improving the error rate of existing technologies when queries are executed.

Other technical effects include reduced computing resource consumption (for example, reduced I/O, reduced memory consumption, etc.). Instead of a full-web crawl, various embodiments focus on specific areas of the web that are in response to or relevant to the user's query. This targeted approach reduces the need for exhaustive crawling, which is more efficient and resource-conscious. Specifically, since targeted crawling focuses only on specific, relevant sections of the web and queries, it processes and stores a much smaller subset of web pages. This significantly reduces the amount of memory required for storing the content and state of the crawl. Additionally, full-web crawls involve a large number of I/O operations as the system reads from and writes to storage to manage the vast amount of data collected from the web. This leads to increased disk wear, slower performance, and higher operational costs. By limiting the scope of the crawl to specific areas of interest, targeted crawling reduces the number of read and write operations. The system only processes the data that is most likely to be relevant, which reduces overall I/O activity. With fewer pages being crawled and stored, accessing and retrieving data becomes faster and more efficient, improving the overall performance of the system.

The broad scope of full-web crawling (which existing technologies do) means that there is a significant delay between the time a page is published and when it is crawled and indexed. This results in outdated or less relevant search results being served to users. Targeted crawling is more responsive to specific queries or topics, allowing for quicker discovery and indexing of relevant content. This not only reduces error rate, but reduces the time between content publication and its availability in search results, leading to lower latency and more up-to-date results. The ability to focus on specific areas allows the crawler to operate in near real-time for high-priority content, which further reduces latency. Additionally, by focusing on a smaller, more relevant subset of the web, targeted crawling significantly reduces the amount of data that needs to be transmitted. The crawler only downloads content that is directly related to the user's query or search needs. Less data is transferred over the network, which not only saves bandwidth but also speeds up the crawling process, as smaller and more relevant data sets are handled.

Targeted crawling also reduces the processing load by focusing computational resources on the most relevant data. This allows the system to handle queries more efficiently, improving overall performance and enabling faster processing of relevant content. CPU cycles and processing power are better utilized since the system is not bogged down by irrelevant or redundant data. Further, by identifying and crawling from seed URLs, various embodiments efficiently discover new and related content that is directly relevant to the user's query, without the need for broad, unfocused crawling, which also improves or reduces error rate for finding relevant search results.

Various embodiments also have the technical effect of reducing error rate because they use URL templates to generate URLs that are likely to exist or be valid. These URL templates includes patterns that are based on typical structures of URLs found on various websites (for example, search query URLs on forums, directories, or social media platforms). In conventional search engines, generating or discovering URLs without using URL templates may lead to irrelevant or non-existent pages being crawled or indexed. This results in inaccurate search results, where users might be directed to pages that do not match their query intent. However, various embodiments use predefined URL patterns to generate URLs that are more likely to exist and be relevant. These patterns are derived from analyzing the typical structures used by various types of websites. By adhering to these URL templates, the generated URLs are more accurate and relevant to the user's query. This reduces the likelihood of generating URLs that lead to irrelevant or error-prone content, thereby decreasing the error rate in search results.

Similarly without using URL templates for URL generation, there is a higher chance of generating URLs that do not correspond to any actual content on the web, leading to "404 Not Found" errors or pages that are irrelevant to the query. Predefined patterns ensure that the generated URLs conform to the structures commonly used by websites. For example, if the pattern corresponds to how a particular forum handles search queries, the generated URL is more likely to direct the user to a relevant search results page on that forum. This approach significantly reduces the generation of non-existent or irrelevant URLs, thus lowering the error rate when users click on search results. Further, conventional methods of generating URLs might not fully align with the user's intent, especially if the generation process does not consider how specific types of websites structure their content. By using predefined patterns tailored to the typical URL structures of different websites, various embodiments ensure that generated URLs are more likely to lead directly to relevant content. For instance, a social media platform might have a specific URL format for user profiles or posts, and using this format helps in directly reaching the relevant content. This increases the relevance of the content linked from the search results, as the URLs are specifically crafted to match the structures known to yield useful information.

There are various technical effects with the technical solution of using models (such as Large Language Models (LLMs)) to generate new URLs in real-time based on the user's query. This method dynamically creates URLs that may not yet exist in the search engine's index but are likely to be relevant to the query. By generating URLs in real-time only when needed, language models reduce the need for extensive pre-computed indexing or storing large numbers of potential URLs. This targeted generation process leads to a more efficient use of processing power, as the system only generates and processes URLs that are immediately relevant to the user's query. The dynamic, on-demand nature of URL generation reduces the overall processor load compared to a scenario where the system must constantly update or maintain a large index of URLs.

Further, real-time generation of URLs allows the system to quickly respond to specific user queries without the need to wait for scheduled crawls or indexing processes. Models can rapidly generate URLs that are highly relevant to the query, which can then be immediately processed and returned in search results. The ability to generate relevant URLs on-the-fly increases the speed at which search results are provided, particularly for niche or long-tail queries.

Additionally, the real-time generation of URLs by models ensures that users receive results that are specifically tailored to their queries, improving the relevance and accuracy of the search results. This leads to a more intuitive and effective search experience, as users are more likely to find what they are looking for without needing to reformulate their queries. The technical effect is enhanced usability due to the high relevance of search results generated by language models, making the search process more straightforward and satisfying for the user.

There is also the technical effect of enhanced reliability. By generating URLs that are contextually relevant and likely to exist, models enhance the reliability of search results. Users can trust that the results provided are current, relevant, and accurate, which increases the overall reliability of the search engine. Consequently, the real-time, context-aware generation of URLs contributes to a more reliable search experience, as users receive results that are consistently accurate and up-to-date.

Utilizing models for real-time URL generation also has the technical effect of simplifying the development process because developers do not need to manually create or manage a large set of URL templates. For example, LLMs dynamically generate URLs based on the context and patterns learned during training, reducing the complexity of the software. Accordingly, the use of models streamlines the development process by automating the URL generation process, making the system easier to develop and maintain. Given that generative models, such as LLMs, have latency for generating URLs, some embodiments alternatively create and use URL patterns/templates. Some embodiments use LLMs offline to create some of these patterns, along with algorithmic processes/regular code.

The organic process described herein offers several technical advantages by leveraging a comprehensive (e.g., inverted) index that focuses on extracting and indexing infrequent or rare terms from URLs, anchor texts, and titles. This enhances recall for niche queries, ensuring that specialized content, which might otherwise be overlooked, is retrieved efficiently. By integrating this process with a larger index that also manages more broadly relevant content, the system delivers balanced search results that combine both niche and mainstream content. The inverted indexing enables faster query matching and retrieval, improving search performance and compute latency by reducing lookup times. Additionally, the process ensures better resource optimization, as only relevant URLs and terms are stored, minimizing redundancy and enhancing search precision. By mapping only relevant terms (especially infrequent or rare ones) to URLs, the system avoids storing unnecessary data, focusing on the most valuable content for niche queries. This reduces the amount of data stored in the index, compared to storing the entire content of webpages. Instead of indexing entire webpages, some embodiments extract only anchor texts, titles, and/or key terms, which are smaller in size. This minimizes the memory footprint while still maintaining relevance in search results.

Turning now to FIG. 1, a block diagram is provided showing aspects of an example computing system architecture suitable for implementing some embodiments of the disclosure and designated generally as system 100. The system 100 represents only one example of a suitable computing system architecture. Other arrangements and elements can be used in addition to or instead of those shown, and some elements are omitted altogether for the sake of clarity. Further, as with system 100, many of the elements described herein are functional entities that are implemented as discrete or distributed components or in conjunction with other components, and in any suitable combination and location according to various embodiments.

Example system 100 includes network(s) 110, which is described in connection to FIG. 9, and which communicatively couples components of system 100 including storage 105. The system 100 is generally responsible for executing natural language command or question query to provide navigational directions and/or a route to a destination query processing and execution module 102, a URL generation module 104, a crawling and discovery module 106, a pre-ranking module 108, a URL validation module 112, an indexing and storage module 114, an exploratory process module 116, a result integration module 118, a feedback module 120, and storage 105. In some embodiments, these components in the system 100 are embodied as a set of hardware circuitry components (for example a hardware accelerator, such as a GPU AI hardware accelerator), compiled computer instructions or functions, program modules, computer software services, a combination thereof, or an arrangement of processes carried out on one or more computer systems, such as computing device 11 described in connection to FIG. 10, and the user device 02*a* and/or the server 06 of FIG. 9, for example.

In some embodiments, the functions performed by components of system 100 are associated with one or more personal assistant applications, services, or routines. In particular, such applications, services, or routines can operate on one or more user devices (such as user device 02*a* of FIG. 9), servers (such as server 06 of FIG. 9), can be distributed across one or more user devices and servers, or be implemented in the cloud. Moreover, in some embodiments, these components of system 100 are distributed across a network, including one or more servers (such as server 06 of FIG. 9) and client devices (such as user device 02*a* of FIG. 9), in the cloud, or reside on a user device, such as user device 02*a* of FIG. 9. Moreover, these components, functions performed by these components, or services carried out by these components are implemented at appropriate abstraction layer(s) such as the operating system layer, application layer, and/or hardware layer of the computing system(s). Alternatively, or in addition, in some embodiments, the functionality of these components and/or the embodiments described herein are performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), and Complex Programmable Logic Devices (CPLDs). Additionally, although functionality is described herein with regards to specific components shown in example system 100, it is contemplated that in some embodiment's functionalities of these components are shared or distributed across other components.

Continuing with FIG. 1, the query processing and execution module 102 is generally responsible for processing and executing a query. In some embodiments, this module 102 includes a query parser, which processes and analyzes the user's query to extract intent, relevant keywords, and contextual information like location and market data. In some embodiments, such query parser, for instance, uses Natural Language Processing (NLP) techniques. For instance, tokenization techniques first break down the query into individual words or tokens. For example, for the query "best restaurants in New York," tokenization would split the query into ["best", "restaurants", "in", "New York" ]. Part-of-Speech (POS) tagging is then used to Identify the grammatical role of each token (for example noun, verb, adjective). Named Entity Recognition (NER) additionally or alternatively identifies specific entities mentioned in the query, such as locations, brands, products, dates, etc. For example, in the query "weather in San Francisco tomorrow," NER would recognize or tag "San Francisco" as a location and "tomorrow" as a date.

In some embodiments, the query parser of the query processing and execution module 102 performs dependency parsing by analyzing the grammatical structure of the query to understand the relationships between words. For example, in the query "hotels near the Eiffel Tower," dependency parsing would identify "hotels" as the main subject and "Eiffel Tower" as the object of the query, indicating a search for accommodations close to a landmark. Various embodiments use intent detection algorithms to detect intent in the query. For instance, rule-based matching uses predefined rules to map query patterns to specific intents. For example, if the query contains "how to," "what is," or "define," some embodiments map it to an informational intent, meaning the user is seeking knowledge or definitions. In another example, one or more machine learning models (such as a neural network) is trained on labeled query data to generate a decision statistic indicative of a prediction of the intent of new queries. For example, a trained model classifies the query "buy iPhone 13" under a transactional intent, indicating the user wants to make a purchase.

Additionally or alternatively, the query processing and execution module 102 uses keyword extraction techniques, such as TF-IDF (Term Frequency-Inverse Document Frequency), to identify important keywords based on their frequency in the query relative to their frequency across all documents or known queries. For example, in the query "affordable family vacations in Europe," TF-IDF highlights "affordable," "family," and "Europe" as important keywords, while downplaying common words like "in." Other techniques additionally or alternatively include keyword density analysis, Latent Semantic Analysis (LSA), and the like.

In some embodiments, the query processing and execution module 102 engages in contextual data extraction. For example, in some embodiments this includes geo-location-based technologies. This uses the user device's IP address, GPS data (latitude and longitude coordinates), location-specific keywords, and/or other location data to determine geographic context. For example, for the query "restaurants near me," some embodiments use the user's current GPS location or IP address to provide results for nearby restaurants.

Alternatively or additionally, the query processing and execution module 102 uses market data extraction. Such extraction extracts and uses market-specific data to tailor the search process according to regional preferences or commercial availability. Market data refers to information that is relevant to a particular geographic region, cultural context, economic environment, and/or commercial landscape. This data helps tailor search results to better match the preferences, availability, and conditions of the user's local market. For example, prices for the same product can vary significantly between countries or regions. For instance, the cost of a smartphone might be lower in one market due to local promotions, taxes, or subsidies. In these embodiments, the query processing and execution module 102 extracts this data from local e-commerce sites, regional pricing databases, or APIs provided by retailers that offer localized pricing information. Popular brands and products is another example of market data. Some brands or products are more popular in certain regions than others. For instance, Xiaomi smartphones might be more popular in China and India, while Apple products dominate in North America. Various embodiments analyze sales data, market research reports, and consumer behavior data to identify which brands or products are trending in a specific market. For example, in the query "buy a phone in Japan," some embodiments use market data to prioritize Japanese online retailers or phone models that are popular in Japan.

In some embodiments, the query processing and execution module 102 further includes a contextual data processor. This component uses the contextual information from the query parser to tailor the search process according to the user's environment, preferences, and historical data. In other words, the contextual data processor takes into account factors like the user's location, previous search history, device type, and/or even time of day to provide more relevant search outcomes. For instance, there may be location-based contextual processing. For example, a user in Paris searches for "best coffee shops." The user's current location is detected as Paris, France (for example via a GPS module). The query processing and execution module 102 then detects that the user's language preference is set to French. The contextual data processor 102 uses the user's location to prioritize coffee shops in Paris. The search results are tailored to include local cafes that are nearby, based on the user device's GPS or IP address. Search results might include reviews and listings in French, and potentially highlight coffee shops that are popular with local residents, as opposed to tourist spots. The processor might rank coffee shops higher if they are within walking distance, have high ratings from French-speaking customers, or are currently open (considering the local time). The user sees a list of coffee shops in Paris, with detailed information such as distance from their current location, customer reviews in French, and possibly even current promotions or busy times.

The URL generation module 104 is generally responsible for generating one or more Uniform Resource Identifiers (URI), such as a Uniform Resource Location (URL) by taking, as input, the parsed query from the query processing and execution module 102 and/or other related data, such the contextual data (for example marking data and geographic data) described above. A URI refers to a string of characters used to identify a resource either by location (as in a URL) or by name (for example Uniform Resource Names). In some embodiments, the URL generation module 104 includes a generative model-based URI generator (e.g., a language model). That is, based on the parsed query and contextual data, an LLM, for example, generates both search URLs and immediate URL candidates in real-time, which is described in more detail below. In other words, for example, some embodiments provide an LLM the parsed query and contextual data as input and the LLM generates URLs. “Search URLs” are the URLs generated or used to perform a search query on a search engine or a specific database. Some search URLs can additionally or alternatively be indexed by a search engine (for example if they provide a good list of niche results). One example of this is AMAZON pages, such as https://www.amazon.com/s?k=sofa+beds, which get indexed and act as category pages. Search URLs are typically constructed to include query parameters that allow the search engine to return a list of results matching the search criteria. They are not intended to point directly to a specific resource but rather to initiate a search process. For example, https://www.example.com/search?q=redbox is a search URL that initiates a search for the term “redbox” on the example.com website. When a language model generates search URLs, it is creating or suggesting URLs that can be used to conduct a search based on the user’s input.

According to various embodiments, the model used or represented by the URL generation module 104 includes any suitable model such as a language model (e.g., a Large Language Model, a Medium Language Model, a Small Language Model, a Sequence-to-Sequence Model (Seq2Seq), a Recurrent Neural Network (RNN), or a Transformer Model), a Markov Chain Model, a Hidden Markov Model (HMM), or a Graph-Based Generative Model. For example, Seq2Seq models convert one sequence of data (like a query) into another sequence (like a URL) using encoder-decoder architectures. For instance, the query text can be encoded, and the model decodes it into a well-formed URL matching relevant structures. In an example, a “model” as described herein refers to any suitable computational or machine learning model that creates new outputs-such as URL candidates-based on input data like a query, contextual information, and/or learned patterns. These models leverage probabilistic rules, sequence learning, and/or pattern recognition to dynamically generate URLs that are likely to lead to relevant content.

URL candidates are specific URLs that have been identified as potential relevant matches for a query or task. These are typically URLs that might directly lead to relevant content or resources. Unlike search URLs, URL candidates are usually direct links to resources, pages, or documents that might satisfy the user’s query or intent. They are often the results you would choose from after conducting a search. When an LLM, for example, generates or suggests URL candidates, it is offering specific URLs that may directly contain the information or resources relevant to the user’s needs.

In some embodiments, the URL generation module 104 additionally or alternative to generative model generation includes a pattern database module, which provides URL templates and patterns that guide the generation and validation of URLs, ensuring they align with known structures and likely lead to relevant content. A “pattern database” in the context of URL generation and validation is a collection of templates or patterns that define the structure of URLs for specific domains or types of resources. These patterns are used to generate and validate URLs, ensuring they conform to known structures that are likely to lead to relevant content. The pattern database stores predefined URL templates that correspond to common structures used by websites or databases. These patterns may include placeholders for variable components, such as search queries, identifiers, or categories. When a URL is generated or provided by the URL generation module 102, the URL generation module 102 compares it against the patterns in the database. If the URL matches a known pattern, it’s considered valid and likely to lead to relevant content. If not, it is flagged for further review or rejected. When creating URLs, various embodiments use the patterns in the database to ensure that the URLs are well-formed and follow the expected structure. This helps in generating URLs that are more likely to lead to the desired content. For dynamic content (such as search results or user-specific pages), the pattern database can be used to generate URLs by filling in the placeholders with appropriate values (for example user input, specific IDs).

In an illustrative example of the pattern database module, there may be a website that offers product pages, where each product page follows a specific URL structure: https://www.example.com/products/{category}/{product-id}. In this case, {category} and {product-id} are placeholders that are to be replaced with actual values. Suppose a request is made to generate a URL for a product in the “electronics” category with a product ID of “12345”: https://www.example.com/products/electronics/12345. Various embodiments use the pattern from the database, replacing {category} with “electronics” and {product-id} with “12345”. To check whether the URL is valid (https://www.example.com/products/electronics/67890), various embodiments compare this URL to the patterns in the database. Since it matches the expected structure, it would be considered valid. The pattern database might contain multiple patterns for different sections of a website. Depending on the type of URL needed, various embodiments select the appropriate pattern and fills in the placeholders accordingly.

Various embodiments maintain a database of URL patterns, each associated with a specific type of resource or query. These patterns include placeholders for variables, such as category names, product IDs, and/or search terms, etc. Example pattern include:

Product Page: https://www.example.com/products/{category}/{product-id}

Search Results: https://www.example.com/search?q={query}

User Profile: https://www.example.com/user/{username}.

After the Query Processing and Execution Module 102 analyzes the user’s query, it extracts the necessary parameters that will be used to fill in the placeholders. Example parameters include: category: “electronics”; product-id: “12345”; query: “laptops”; username: “john doe”. Various embodiments first identify the context of the query or task to determine which type of URL is needed. This decision might be based on the type of resource being requested (for example product details, search results, user profiles). Example logic includes the following: If the query is a search term, select the search results pattern. If the query requests specific product details, select the product page pattern. Various embodiments then select the corresponding pattern from the pattern database. For example, if the query is about finding a specific product, the pattern https://www.example.com/products/{category}/{product-id} is chosen. Various embodiments then fill in the placeholders by replacing each placeholder in the selected URL pattern with the appropriate parameter value extracted from the query. For example, start with pattern: https://www.example.com/products/{category}/{product-id}. Then replace {category} with “electronics”: https://www.example.com/products/electronics/{product-id}replace {product-id} with “12345”: https://www.example.com/products/electronics/12345.

Therefore, the final URL is https://www.example.com/products/electronics/12345.

The crawling and discovery module 106 is generally responsible for exploring and identifying new or updated web content to add to the search engine's index. In other words, the module 106 systematically explores web content by fetching data from URLs and discovering new links to ensure the most relevant and up-to-date information is collected and indexed. In some embodiments, the module 106 includes an initial URL Crawler. This component crawls the initial set of URLs generated by the URL generation module 104 and/or retrieved from the index, fetching content and discovering outlinks from the pages. An "outlink" is a hyperlink on a webpage that points to another webpage or resource outside of the current page. It directs users to a different URL, which could be on the same website or a completely different domain. Outlinks are used to link to external content, reference additional information, or guide users to related resources.

The crawler visits each URL in the initial set (such as those URLs generated by the URL generation module and/or validated by the URL validation module) and downloads the content found at that URL. This content can include text, images, metadata (like page titles and descriptions), and other resources. Suppose the initial URL is https://example-.com/latest-ai-news. The Initial URL Crawler accesses this webpage and fetches the full content of the page, which might include the latest articles about AI, images, and links to other related articles. While fetching the content from the initial URL, the crawler also identifies and extracts hyperlinks (outlinks) embedded in the page. These outlinks point to other web pages, either within the same website or on external sites. For example, on the https://example.com/latest-ai-news page, there might be links to other articles, such as https://example.com/ai-ethics or https://anotherwebsite.com/ai-tools. The Initial URL crawler collects these outlinks and adds them to the list of URLs for potential crawling in subsequent iterations. The fetched content and discovered outlinks are processed and may be added to the search engine's index, making the information available for future queries.

In some embodiments, the crawling and discovery module 106 further includes an iterative crawler, which performs subsequent iterations of crawling to explore new outlinks and expand the content set, adding newly discovered URLs to the list for further crawling. The iterative crawler is responsible for deepening the exploration of web content by performing multiple rounds (iterations) of crawling. After the initial URL crawler of the crawling and discovery module 106 fetches content and discovers outlinks from the initial set of URLs, the iterative crawler takes over to explore those outlinks. The iterative crawler begins by visiting the URLs (outlinks) discovered during the initial crawl. It fetches content from these new URLs just as the Initial URL Crawler did with the first set. Continuing from the previous example, the iterative crawler now visits the discovered outlinks like https://example.com/ai-ethics and https://anotherwebsite.com/ai-tools. It downloads the content from these pages, which might include articles on AI ethics and AI tools, respectively. While fetching content from these newly crawled pages, the iterative crawler identifies additional outlinks (links to other pages) embedded in these pages. These newly discovered URLs represent further content to explore in subsequent iterations. For example, on the https://example.com/ai-ethics page, there might be a link to another article like https://example.com/ai-bias. Similarly, on https://anotherwebsite.com/ai-tools, there might be a link to https://thirdwebsite.com/ai-tool-comparison. The Iterative Crawler discovers these outlinks and adds them to the list of URLs to crawl in the next iteration. With each iteration, the crawler expands the set of URLs by continually adding newly discovered outlinks. This allows the crawler to cover more ground, finding content that might be several links removed from the original query but still relevant. The iterative crawler continues this process, repeatedly crawling new outlinks and expanding the content set, until a predefined stopping condition is met (for example reaching a maximum number of iterations, time limit, or lack of new relevant outlinks). For example, the iterative crawler is set to perform up to 3 iterations. After exploring the AI ethics and AI tools pages, it follows further outlinks discovered on those pages, and so on, until it completes the set number of iterations.

In some embodiments, the crawling and discover module 106 includes a real-time crawler. A real-time crawler is a specialized component designed to ensure that the search engine's index is continuously updated with the latest and most relevant content. This crawler operates in real-time, meaning it works immediately and concurrently with other processes to fetch and index newly generated or updated URLs as soon as they appear. This is particularly useful for queries that require the most current information, such as breaking news or real-time events. Unlike traditional crawlers, which may operate on a schedule or in response to broader crawling directives, the real-time crawler is triggered by specific events, such as the generation of a new URL by a large language model (LLM), the detection of an update on a monitored site, or a user query that requires the latest information. Once activated, the real-time crawler immediately visits the relevant URL, fetches the content, and processes it for indexing. The fetched content is then instantly indexed, meaning it becomes available in the search engine's results right away, without waiting for a scheduled indexing process. This ensures that users receive the most up-to-date results possible.

The pre-ranking module 108 is generally responsible for evaluating and ranking URLs based on their relevance to a user's query using factors like query content, anchor text, and/or page metadata, ensuring the most relevant content is prioritized for indexing and retrieval. In some embodiments, the inputs to the pre-ranking module 108 includes user query content, discovered URLs (from crawling process(es) of the crawling and discovery module 106), anchor text associated with URL (for example the visible, clickable text of hyperlinks that lead to the discovered URLs), metadata from linked pages (such as titles or descriptions), and/or contextual data (such as user location, market data). The output of the pre-ranking module 108 is a ranked list of URLs (or web pages) with associated relevance scores. These scores indicate how relevant each URL is to the user's query, and the list is used to prioritize which URLs should be indexed, further crawled, or presented in the search results.

In some embodiments, the pre-ranking module 108 includes a pre-ranker, which pre-ranks the URLs based on relevance to the query using a language model, such as an LLM, factoring in elements like query content, anchor text, and/or linked page titles. The pre-ranker receives a list of URLs that have been generated, discovered, or retrieved, which are potentially relevant to the query. In some embodiments, each URL comes with associated data such as anchor text (the clickable text in a hyperlink), titles of the linked pages, and possibly snippets of metadata or content summaries. In some embodiments, an LLM (Large Language Model) analyzes the content of the query to determine what the user is likely looking for. It identifies key topics, entities, and the overall intent of the query. The LLM evaluates the anchor text associated with each URL to see how well it matches the user's query. Anchor text provides a clue about the content of the linked page. In some embodiments, the title of the linked page is also analyzed. Titles often give a concise summary of a page's content, so the LLM checks how closely these titles align with the user's query. The LLM or other language model combines the insights from the query content, anchor text, and page titles to calculate a relevance score for each URL. This score indicates how likely it is that the URL will lead to content that satisfies the user's query.

The pre-ranker 108 produces a ranked list of URLs based on their relevance scores. URLs with higher scores are prioritized for further processing, such as deeper crawling, indexing, or immediate inclusion in the search result. For example, a user searches for "best laptops for gaming under $1000." The query "best laptops for gaming under $1000" is processed by the LLM, which identifies the key components: "laptops," "gaming," and "under $1000." The Pre-Ranker receives a list of URLs, such as:

https://techreviews.com/best-gaming-laptops
https://cheaplaptops.com/laptops-under-1000
https://gamingworld.com/top-laptops-2024

The anchor text is "Best Gaming Laptops of 2024" "Affordable Laptops Under $1000" and "Top Gaming Laptops for Budget Buyers." The page titles are, "Best Gaming Laptops of 2024—Reviews and Ratings", "Affordable Laptops Under $1000—Buying Guide", and "Top Gaming Laptops for Budget Buyers—2024." With respect to relevance scoring, the language model evaluates query content by focusing (for example via attention) on gaming laptops and a budget constraint of $1000. The language model further checks if the anchor text mentions gaming, laptops, and affordability. The language model further analyzes if the titles specifically address gaming laptops within the budget range. With respect to the relevance Scores, https://techreviews.com/best-gaming-laptops might get a high score because both the anchor text and page title closely match the user's intent. https://cheaplaptops.com/laptops-under-1000 might receive a lower score because, while it mentions the budget, it doesn't emphasize gaming. https://gamingworld.com/top-laptops-2024 might also score high due to the focus on gaming, though it may rank slightly lower if it doesn't emphasize the budget aspect as much. These rankings determine which URLs should be prioritized in the search engine's further processing, including deeper crawling or indexing.

The URL validation module 112 is generally responsible for verifying the relevance and structure of URLs by comparing them to known patterns or templates, ensuring that they are likely to lead to relevant content. In some embodiments, the inputs to the module 112 are the URLs generated by the URL generation module 104, discovered URLs determined by the crawling and discovery module 106, and/or known URL patterns or templates from the pattern database. In some embodiments, the outputs of the module 112 are validated URLs with similarity scores indicating how closely they match known patterns, determining their relevance and potential inclusion in the search results.

In some embodiments, the URL validation module 112 includes a pattern matching validator is responsible for ensuring that generated URLs are likely to be valid and relevant before they are processed further. In some embodiments, this is done by comparing the structure of these generated URLs against a database of known URL patterns (or templates). For instance, the module 112 receives URLs generated by the URL generation module 104 in response to a user's query. These URLs are created dynamically, so they need to be validated to ensure they are likely to lead to useful content. The generated URLs are compared against the patterns in the database. Various embodiments then use a similarity scoring algorithm to evaluate how closely the structure of a generated URL matches the known patterns. For instance, the algorithm can compare components such as the domain, path structure, query parameters, and overall format of the URL. Higher similarity scores indicate a closer match to a known pattern, suggesting that the URL is more likely to be valid and relevant. Conversely, a lower score suggests that the URL might be incorrect or less likely to lead to relevant content. If the similarity score of a generated URL meets or exceeds a certain threshold, the URL is considered valid and is passed on for further processing, such as crawling or indexing by the crawling and discovery module 106. URLs that score below the threshold may be rejected or flagged for further analysis, as they are less likely to be valid or useful.

In an illustrative example, a user searches for "latest AI research papers." The URL generation module 104 generates a URL such as, https://examplejournal.com/search?q=AI+research+2024. The pattern database contains known structures for search URLs on academic journals and research databases. For example:

https://journalwebsite.com/search?q=###Query###
https://researchportal.com/find?query=###Query###
https://examplejournal.com/search?q=###Query###

The URL validation module 112 then compares the generated URL https://examplejournal.com/search?q=AI+research+2024 against the patterns in the database. The domain examplejournal.com matches exactly with one of the patterns. The path /search?q=###Query### is a close match to the template in the pattern database. The generated URL receives a high similarity score because it closely matches the known pattern for search URLs on the examplejournal.com domain. Since the similarity score is high, the URL https://examplejournal.com/search?q=AI+research+2024 is validated and considered likely to lead to relevant content. It is then passed on for further processing, such as crawling and indexing.

In some embodiments, the URL validation module 112 includes a content validator that ensures that the fetched content meets predefined quality and relevance criteria before it is indexed. Examples of bad content includes spam, and junk (for example boilerplate content). After a URL has been crawled, the content validator receives the content of the web page, which can include text, images, metadata, and/or other elements. The URL validation module 112 has a set of predefined rules and benchmarks that the content must meet to be considered valid. These criteria can be based on factors like content originality, depth of information, relevance to the query, and more. For instance, the content validator checks if the content is original or if it's duplicated across multiple sources. Original content is typically given higher priority because it offers unique value to the user. For example, if the content is an article that appears on multiple websites without much variation, it may be flagged as low quality or redundant.

In some instances, the content validator of the URL validation module 112 evaluates whether the content covers the topic in sufficient depth and provides comprehensive information. Shallow content with little detail or lacking supporting data may be rated as lower quality. For example, an article that thoroughly explains AI research with references, data, and examples would be rated higher than a brief overview with little detail. In some instance, the content validator uses the quality and relevance assessments to assign scores to the content. If the content meets or exceeds certain thresholds for quality and relevance, it is approved for indexing. For example, a piece of content with high scores for originality, depth, and keyword relevance would be indexed and made available in search results. If the content does not meet the required standards, it is rejected or flagged for further review. This ensures that only the best content is included in the index. For example, content that is poorly written, off-topic, or largely duplicated from other sources is excluded from the index.

The indexing and scoring module 114 is generally responsible for processing, organizing, and storing validated content in the search engine's index, ensuring it is quickly retrievable for future queries. The inputs are validated content, including text, metadata, and/or relevance scores, that has passed through the content validation process. The outputs are an updated search index where the validated content is organized and stored, making it quickly accessible for future search queries.

In some embodiments, the indexing and scoring module 114 includes a real-time indexer, which instantly processes and adds newly discovered content to the search index as soon as it is validated. This ensures that the most recent and relevant information is immediately available for inclusion in search results. For example, if a new article on "AI advancements in 2024" is discovered and validated, the Real-Time Indexer quickly stores this article in the search index so that users searching for "AI advancements" can access this up-to-date content right away.

In some embodiments, the indexing and scoring module 114 includes an index updater, which regularly revisits and updates existing entries in the search index by refreshing content that has been newly crawled. It also removes or modifies entries that are outdated or no longer relevant, ensuring the index reflects the most current state of the web. For example, an older article on "AI trends in 2022" might be refreshed if new information is added or if it is still relevant but needs an update. Conversely, if the article is outdated and no longer relevant, the Index Updater might remove it from the index.

In some embodiments, the indexing and scoring module 114 includes index maintenance functionality, which handles ongoing tasks like removing deadlinks, de-duplicating entries, and ensuring the index remains efficient and up-to-date. The index maintenance component performs ongoing tasks to keep the index clean and efficient. This includes removing deadlinks (URLs that no longer work), de-duplicating entries (removing duplicate content), and optimizing the index to ensure fast retrieval of search results. For example, if several URLs in the index point to similar content about "AI ethics guidelines," the index maintenance component will de-duplicate these entries, keeping only the most authoritative or relevant version, and removing any links that no longer work.

The exploratory process module 116 is generally responsible for systematically discovering and expanding content by iteratively crawling outlinks from seed URLs to uncover new, relevant information for indexing. The inputs are seed URLs (for example search result URLs, previously discovered URLs from the crawling and discovery module 106 and/or those URLs generated by the URL generation module 104) and/or the user query. The outputs are newly discovered URLs and content that are relevant to the query, ready for validation and indexing. The exploratory process module 116 is designed for deep, targeted discovery of new and potentially unindexed content in response to a specific user query. It focuses on expanding the search for content that may not have been captured during general crawling (for example as performed by the crawling and discover module 106), particularly by following seed URLs and iteratively exploring linked content. This module is more focused and query-specific, initiating deep dives into content areas directly related to a user's search query. It uncovers hidden or hard-to-find content by starting with seed URLs and progressively crawling through related pages.

In some embodiments, the exploratory process module 116 includes a seed URL identifier, which selects initial URLs, known as "seed URLs," that are likely to lead to relevant content when explored further. These URLs serve as starting points for the crawling process. Some embodiments, for example, identify these URLs based on their relevance to the query, historical data, and potentially other contextual factors like user location or search history. For example, a user searches for "emerging trends in AI ethics." The seed URL identifier selects seed URLs from reputable sources like academic journals, trusted AI ethics blogs, or government reports. For example, it might choose https://aijournal.com/ethics-trends-2024 as a seed URL because this page is known to cover relevant topics extensively.

In some embodiments, the exploratory process module 116 includes an exploratory controller that manages the process of iterative crawling, where some embodiments start from the seed URLs and systematically explores linked content (outlinks) on these pages. The controller directs the crawler to follow these outlinks through multiple levels (iterations), continuously expanding the set of content related to the query. It also determines how deep the crawling should go and prioritizes the discovery of the most relevant content. For example, continuing with the "emerging trends in AI ethics" query, the initial seed URL (https://aijournal.com/ethics-trends-2024) contains links to other related articles and resources. The exploratory controller instructs the crawler to follow these links to articles like https://aijournal.com/ai-ethics-case-studies and https://ethicsworld.org/ai-ethics-reports-2024. It may go deeper, exploring links within these secondary pages to uncover further content, such as detailed case studies or new AI ethics frameworks.

In some embodiments, the exploratory process module 116 includes an outlink deduplicator. As the crawler explores more pages, it may encounter multiple URLs that point to the same or very similar content (for example different URLs for the same article or duplicate content hosted on different sites). The outlink deduplicator's job is to identify and eliminate these redundant URLs, ensuring that only unique, valuable content is indexed. This prevents the search engine from storing and processing duplicate entries, which optimizes both the index and the search results. For example, during the exploration of AI ethics content, the crawler encounters multiple URLs pointing to the same report, such as https://aijournal.com/ai-ethics-case-studies and a mirrored version at https://anotherjournal.com/ai-ethics-case-studies. The outlink deduplicator detects that these URLs lead to the same content and removes the duplicate entry, keeping only one version in the index. This helps in maintaining an efficient and clean index, ensuring users don't encounter redundant results in their searches.

The result integration module 118 is generally responsible for combining and ranking all validated and relevant content from various sources, ensuring the most pertinent results are presented to the user in response to their query. The inputs are validated URLs (for example from the modules 104, 106, and/or 116) with relevance scores, and user query details. The output is a final, ranked list of search results tailored to the user's query, ready for display in the search engine's results page.

In some embodiments, the result integration module 118 integrates the results from the index, including dynamically generated URLs, applying the final ranking to produce the most relevant search results. The result integration module 118 applies a final ranking algorithm that re-evaluates all integrated results based on several factors, including relevance scores from initial pre-ranking, adjusted based on any new data or context from the query, factors like the user's location, search history, or preferences may be considered to adjust rankings further, and/or freshness and quality—some embodiments prioritize newer or higher-quality content if it's particularly relevant to the query. The result integration module 118 then ranks and orders the results from most to least relevant, producing a final ranked list that is tailored to the user's specific query. For example, a user searches for "top budget laptops 2024." URLs generated on the fly (for example from the URL generator module 104, like https://laptops2024.com/top-5-budget-laptops based on the LLM's understanding of the query. This list may also include URLs discovered during the exploratory process module 116, such as https://budgettech.com/latest-laptop-reviews, which may have been newly indexed or found through deeper crawling. The result integration module 118 then evaluates each URL based on how well it matches the user's intent, keywords, and other query-related factors. For example: https://techreviews.com/best-budget-laptops might have ahigh relevance score due to its comprehensive review and match with the query terms. https://laptops2024.com/top-5-budget-laptops might be ranked slightly lower if it's less comprehensive or newer but still highly relevant. The system orders the URLs into a final ranked list, with the top results being the most relevant and useful based on the factors considered. A search execution engine then executes the final retrieval and presentation of search results to the user, combining all processed data into a coherent response.

The feedback module 120 is generally responsible for collecting and analyzing user interactions with search results to refine and improve the relevance of future queries and rankings. For example, a user interaction tracker monitors how users interact with the search results, collecting feedback and data to refine future search processes. A contextual data processor additionally or alternatively updates the user's profile and contextual data based on interaction history, further personalizing future searches.

Example system 100 also includes storage 105. Storage 105 generally stores information including indices (for example a real-time index), computer instructions (for example, software program instructions, routines, or services), data structures, and/or models used in embodiments of the technologies described herein. In some embodiments, storage 105 represents any suitable data repository or device, such as a database, a data warehouse, RAM, cache, disk, RAID, and/or a storage network (for example Storage Area Network (SAN)). In some embodiments, storage 105 includes data records (for example database rows that represent each cluster) or other data structures (for example key-value pairs) that contain any suitable information described herein. In some embodiments, each record is called or requested and returned, over the computer network(s) 110, depending on the component needing it, as described herein.

Figure 2:
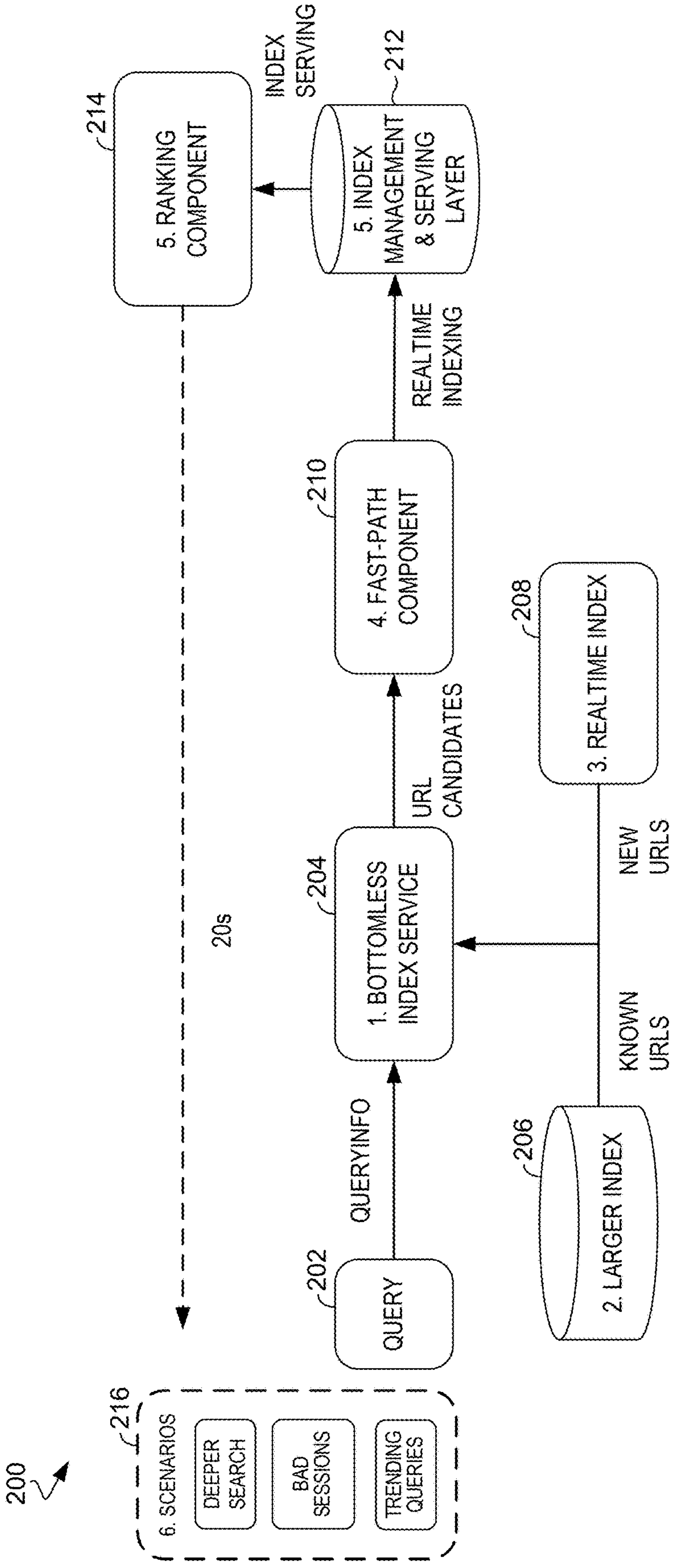
FIG. 2 is a block diagram of an example search engine architecture, combining indexing with real-time updates and specialized processing for different query types, according to some embodiments.

FIG. 2 is a block diagram of an example search engine architecture (referred to as system 200), combining indexing with real-time updates and specialized processing for different query types, according to some embodiments. The system 200 includes a query 202, a bottomless index service 204, a larger index 206, a real-time index 208, a fast-path component 210, an index management and serving layer 212, a ranking component 214, and one or more scenarios 216. In some embodiments, the bottomless index service 204 includes the URL generation module 104, the crawling and discovery module 106, the pre-ranking module 108, the URL validation module 112, the indexing and storage module 114, and/or the exploratory process module 116 of FIG. 1.

At a first time, the bottomless index service 204 receives query information (for example the query, market data, and geographic location data) from the query 202, as well as indexes from known URLs in 206 and new URLs from the real-time index in 208. The bottomless index service 204 is generally responsible for the continuous selection, crawling, and indexing of web content. Its primary function is to ensure that the search engine's index is constantly updated with new and relevant information, essentially making the index "bottomless" in the sense that it is continually expanding and never "full" or complete. This service enables the search engine to adapt to the ever-growing and changing content on the web. The inputs to the service 204 are Seed URLs, user queries, the pattern database, historical data (for example information from previously indexed content that can help guide the selection of new content to crawl), existing indices from 206, real-time indices from 208, and/or contextual data (for example market data, location data, and other contextual information that might influence which content is prioritized for crawling and indexing). The outputs of the service 204 is the URL candidates.

The arrows coming from the larger index 206 and the real-time index (LLM-driven) 208 to the bottomless index service indicates that the bottomless index service relies on these indexes to inform its operations. The indexes in 206 and 208 contain vast amounts of indexed content. This content can provide valuable insights for the bottomless index service 204 when deciding what new content to discover, crawl, or index next. The bottomless index service 204 uses information from these indexes to identify gaps in the content, prioritize certain topics, or update URLs that have changed. Essentially, the indexes help guide the service 204 determining where to focus its crawling and URL generation efforts. In some embodiments, when the bottomless index service 204 generates new URL candidates or discovers new content, it cross-references these URLs against the larger indexes (for example in 206) to avoid duplicating efforts or to refresh content that may already be indexed but needs updating.

The larger index database 206 represents an extended indexed URL pool (for example 10 trillion URLs), using a URL repository built into an inverted index, utilizing URLs and anchor/title text when available, as described in more detail below. The larger index database 206 is significantly larger than conventional search engine indices and emphasizes indexing a vast number of URLs, including those from small or less frequently visited sites, to capture a wider range of content. By indexing a vast number of URLs, including those from niche and less frequently visited sites, the various embodiments ensure comprehensive coverage, especially for rare and obscure queries. Consequently, users receive more complete and relevant search results, even for specialized or uncommon queries. In some embodiments, the larger index 206 is not a regular search engine index, but a "shallow" (a full document content is not used for indexing, but only URL, Title, and/or Anchor), and 10-100× larger by document count index. Classic indexes typically have replication to multiple regions to reduce user search latencies, e.g. 10 regions. Larger index 206 in some instances is stored only in one region/datacenter. In some embodiments, the documents stored in the larger index 206 are "unverified" and are potentially stale or no longer valid, meaning documents are stored based on stored data accumulated over years, and some documents were never re-crawled. In some instances, the larger index 206 is not directly served to users. Rather, the documents are retrieved from larger index 206, and crawled to verify they exist, and to get latest content.

The real-time index 208 is a more dynamic and responsive index that focuses on incorporating the most current and relevant content (for example because it is generated responsive to a query request). Unlike the larger index 206, the real-time index 208 is continuously updated, often in response to specific queries or trends. It ensures that the search engine has access to the latest content, such as breaking news, newly published articles, or trending topics. The real-time index 208 complements the larger index 206 by filling in the gaps for content that is time-sensitive or highly relevant to current user queries. It ensures that users receive the most up-to-date results, even for the latest developments that may not yet be reflected in the larger index 206. The real-time index is "LLM-driven" because LLMs play a role in selecting, generating, and prioritizing the URLs that are indexed in real-time. In some embodiments, LLMs are used to generate URL candidates in real-time, based on user queries or other contextual data. In some embodiments, LLMs are used to generate seeds. Patterns are alternatively or additionally used to generate seeds. And existing search engine results can be seeds). These URLs are not necessarily pre-existing but are crafted by the LLM to point to content that is likely to be relevant. In some embodiments, LLMs are also employed to rank these URLs according to their relevance to the user's query. The model analyzes factors such as the query's intent, the context provided by the user, and the content associated with each URL to determine which should be prioritized in the index. The use of LLMs allows the real-time index 208 to be highly adaptive, making decisions on-the-fly about which content to index, based on the latest available data and user interactions. The real-time index 208 is continually fed with URLs that are generated and ranked by LLMs. This ensures that the index is always reflecting the most current and contextually relevant content, tailored to the specific needs and behaviors of users.

The fast-path component 210 is generally responsible for streamlining the processing of certain URLs or content that needs to be rapidly integrated into the search engine's index. This component ensures that content which is identified as highly relevant or time-sensitive can bypass some of the more time-consuming steps in the typical indexing process, getting it into the search results faster. Inputs may include URLs that are generated or identified as being highly relevant or time-sensitive, such as those related to breaking news, trending topics, or critical updates. Specific queries may also trigger the fast-path process, especially if they relate to topics that require the most current information. The outputs include rapidly indexed content that is quickly processed and added to the search engine's index, ensuring it is available for retrieval in response to user queries. The index is updated with this high-priority content, making it available in real-time for search results. The fast-path component 210 is thus latency optimized with lower throughput. This is particularly useful for content that is highly relevant at the moment or expected to have a short window of peak relevance. The fast-path component 210 works closely with the real-time index 208, ensuring that the most current and relevant content generated or discovered is indexed and made searchable almost immediately. By providing a "fast path" for critical content, this component 210 reduces the latency between content discovery or generation and its availability in the search engine results, enhancing the user experience for queries where speed and relevance are crucial.

The index management and serving layer 212 is generally responsible for the efficient retrieval and serving of that content in response to user queries. It acts as the repository where the indexed data is stored and managed, ensuring that search queries are processed quickly and accurately using the most up-to-date information. For example, 212 may be serve technology for incrementally updating in-memory index which is used for indexing documents in seconds, and providing retrieval functionality for the indexed set of documents. The layer 212 receives content that has been indexed in real-time, which includes the most current and contextually relevant URLs and web content. It may also receive content via the fast-path component 212, ensuring that high-priority or time-sensitive information is immediately available for retrieval. As new content is indexed, either through the real-time process or from other sources like the larger index 206, it is integrated into the layer 212. The layer 212 is thus where all the indexed content, both real-time and historical, is stored and managed. It ensures that the search engine has a comprehensive and accessible database to draw from when responding to user queries. The layer 212 pulls the necessary data from the real-time index 208 it manages, and serves these results to the user device, ensuring that the results include the latest and most relevant information available. The user device receives search results that are up-to-date, accurate, and relevant, thanks to the layer 212's role in managing and serving the indexed content.

Figure 3:
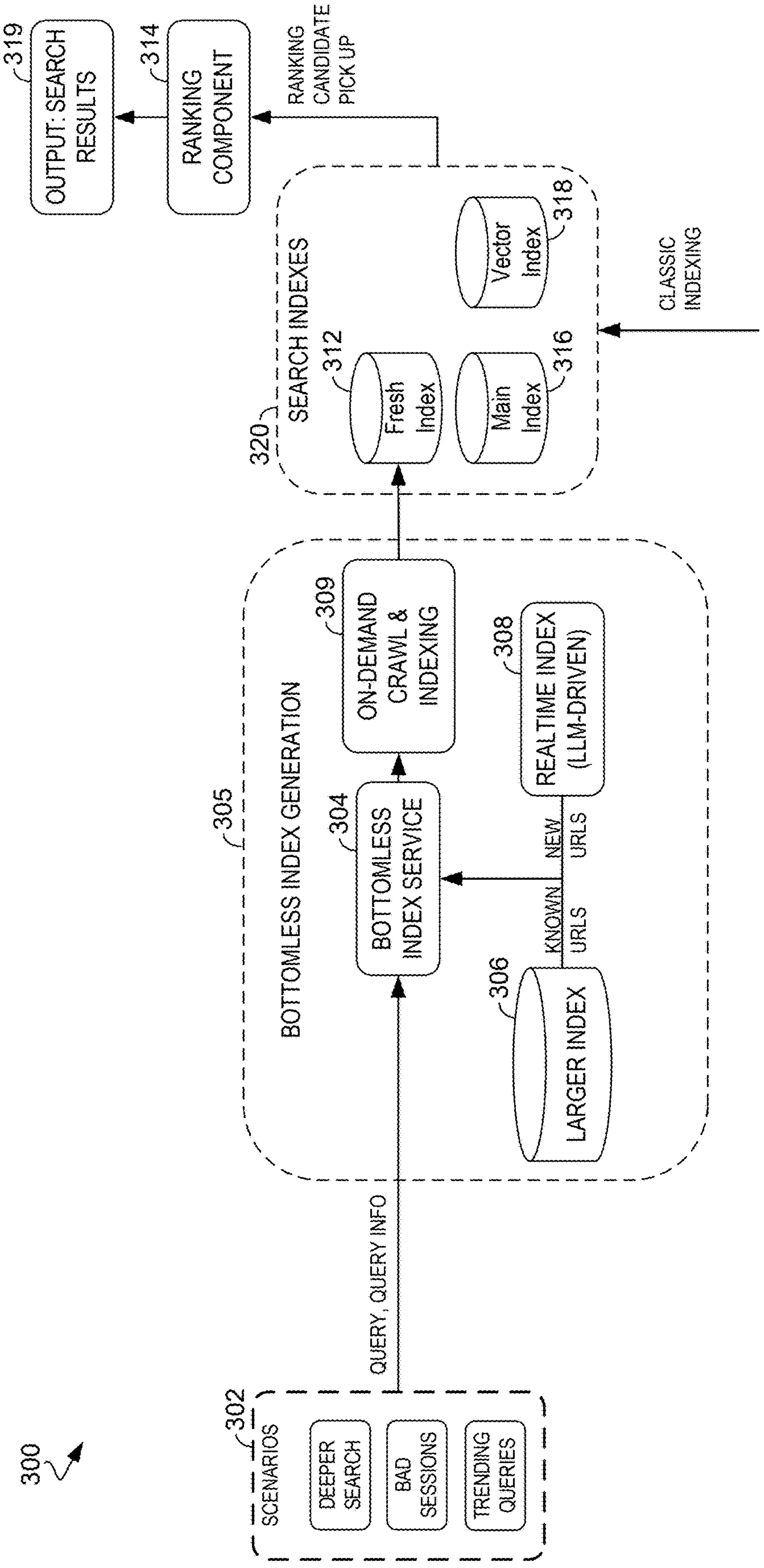
FIG. 3 is a block diagram of an example search engine architecture, illustrating a unique index generation path, according to some embodiments.

The ranking component 214 is generally responsible for query parsing and retrieving from indexes based on query keywords/vector, and provides host for rankers which calculate relevance between the query and documents retrieved from indexes (for example 320 Search Indexes of FIG. 3). The output of the ranking component 214 is a set of search results that have been prioritized based on their relevance, importance, and/or possibly other dynamic factors. These results are organized in a way that ensures the most valuable resources are presented to the user at the top of the search results. In some embodiments, the ranking component 214 considers factors like user intent, query context, and/or the importance of the information. In some embodiments, the ranking component 214 dynamically adjusts the prioritization based on real-time data and/or user behavior, ensuring that the most relevant resources are always presented first. This is particularly useful in scenarios where the relevance of resources can change quickly, such as in response to breaking news or trending topics. For instance, it might give higher priority to resources that are more relevant to the user's current context or those that are more likely to satisfy the query intent. The ranking component 214 organizes these resources into a final ranked list, ensuring that the most important and relevant URLs appear at the top. If the user's behavior or real-time factors suggest a change in priority (for example a sudden spike in interest in a related topic), ranking can adjust the prioritization accordingly.

The user receives a list of search results in 216 that are prioritized and ordered based on their relevance and importance, ensuring that the most critical information is easily accessible. The scenarios in 216 represent different operational modes or use cases that the system 200 may handle. These scenarios dictate how the system adjusts its behavior or prioritizes certain processes to optimize search results under specific conditions. The "deeper search" scenario 1 refers to situations where the search engine needs to perform more intensive or exhaustive searches to find relevant content. It might involve deeper crawling, accessing less commonly indexed sources, or applying more sophisticated algorithms to retrieve high-quality results. This scenario could trigger the system 200 to engage more resources or advanced techniques in the bottomless index service 204 or exploratory process module 116 to ensure comprehensive results are found, even if the query is particularly challenging or niche.

Bad Sessions or bad Search Engine Results Page sessions refers to instances where the user experience has been suboptimal. These bad sessions could be due to poor-quality results, irrelevant content, or technical issues. The system 200 has mechanisms to detect and address these issues. In this scenario, the system 200, in some embodiments, re-processes or re-ranks the results by revisiting the indexes or adjusting the result integration module 120 to improve the quality of the SERP. It might also trigger additional analysis or rerun certain queries to correct the session.

Trending queries refers to queries related to current trends or topics that are suddenly gaining popularity. Trending queries in some instances need special handling because they often require the most up-to-date content that might not yet be fully indexed. In some embodiments, for trending queries, the system 200 likely prioritizes the real-time index 208 to fetch and index the latest content. It may also engage the real-time crawler and real-time indexer more aggressively to ensure that new information is captured and presented quickly. The scenarios in 216 thus represents a set of conditions or triggers that dictate how various components (like the bottomless index service 204, real-time index 208, and result integration module 118) should behave. Depending on the scenario (for example "Deeper Search," "Bad Sessions," or "Trending Queries"), the system 200, in some instances, adapts its crawling, indexing, and ranking strategies to better meet the needs of the query or address issues in previous search sessions.

FIG. 3 is a block diagram of an example search engine architecture (referred to as system 300), illustrating a unique index generation path, according to some embodiments. In some embodiments, the system 300 represents the system 200, except with more detailed steps, as described in more detail below. For instance, in some embodiments, the larger index 306 represents the larger index 206 of FIG. 2, the real-time index 308 represents the real-time index 208 of FIG. 2, the bottomless index service 304 represents the bottomless index service 204 of FIG. 2, the fresh index 312 represents the index management and serving layer 212 of FIG. 2, and/or the ranking component represents the ranking component 314 of FIG. 3.

In response to receiving the query, a bottomless index is generated at block 305, which includes processes and components 304, 309, 306, and 308. Specifically, at a first time, a query, as well as query information, such as one or more of the scenarios 302, are received by the bottomless index service 304. The bottomless index service 304 receives new URLs from the real-time index 308 and known URLs from the larger index 306, which are both considered URL candidates. The bottomless index service 304 generates and/or passes URL candidates (for example the new or known URLs from 306 and/or 308) to the on-demand crawl component 309.

The on-demand Crawl and indexing 309 is generally responsible for executing targeted or specialized crawling and indexing operations based on the immediate needs of the system 300. For example, 309 can include document parsing, keyword extraction, document level feature generation, spam detection etc. This part of the component initiates crawling operations as needed, rather than as part of a continuous, broad-scale crawl. It targets specific URLs or content identified by the bottomless index service 304, especially those that need immediate attention or indexing due to their relevance or time-sensitivity.

The bottomless index service 304 identifies or generates URL candidates that require immediate or targeted crawling. These URLs are then passed to the on-demand crawl and indexing 309 for processing. The on-demand crawl and indexing 309 initiates crawling specifically for the URLs received, focusing on gathering content that is likely to be relevant and necessary for immediate indexing. This targeted crawl is performed to ensure that important content is indexed quickly, without waiting for a broader crawl to happen. After crawling, the content may pass through the indexing gateway, where it is validated, filtered, or prioritized. The IG ensures that only high-quality, relevant content proceeds to the next stage. The content can then be held temporarily in the indexing buffer or broker, which manages the flow of data into the index. This step ensures that indexing happens smoothly, without overwhelming the system, and that the most critical content is handled first. Finally, the processed and validated content is added to the bottomless Index through the B.I. Indexing process. This step integrates the new content into the search engine's index, making it available for future queries.

The bottomless index service 304 processes and indexes content, which is then distributed to the various search indexes in 320 (fresh index 312, main index 316, vector index 318) based on the type and characteristics of the content. The content goes to fresh index 312 first, given this gives incremental low-latency indexing. The content is also send to main index, which is subject to batch (e.g. weekly) updates. Once a document becomes available in the main index it may be removed from the fresh index. Each index is optimized for different types of content or different retrieval needs, ensuring that the search engine can quickly and accurately provide relevant results based on the query. When a user submits a query, the search engine can access any of these indexes (e.g., fresh index 312 for real-time data, main index 316 for dynamic content, and vector index 318 for large-scale data) to retrieve the most relevant results. The use of multiple specialized indexes allows the search engine to handle a wide variety of queries efficiently, providing users with accurate and timely information.

The Search Indexes (e.g., fresh index 312, main index 316, and vector index 318) represent different repositories or storage systems where the indexed content is stored and managed. Each of these indexes serves a specific role or is optimized for certain types of content or queries. Fresh index 312 incrementally updates in-memory index which is used for indexing documents and provides retrieval functionality for the indexed set of documents. It stores content that has been recently crawled and indexed, particularly time-sensitive information that needs to be quickly accessible for user queries. As the real-time index, fresh index 312 ensures that the most current content is prioritized, especially for queries that demand the latest information. The content that has been processed and indexed by the bottomless index service 304 is fed into fresh index 312, where it is stored as part of the real-time index.

Main index 316 is an index that is updated in batch (for example weekly). In other words, main index 316 is updated periodically to incorporate new or changed content but does not reflect real-time changes, making it stable and reliable for general searches. Vector index 318 refers to a specialized data structure used in vector-based search systems, which involve semantic or neural search approaches. Unlike traditional indexing that relies on keyword matching, a vector index represents data (such as text, images, or other content types) as vectors in a multi-dimensional space. This approach is particularly useful for searching and ranking content based on semantic similarity rather than just keyword overlap. Vector index 318 receives content from the bottomless index service 304.

The ranking component 314 selects or retrieves potential search results (ranking candidates) from the various search indexes 320 to prioritize and rank them before presenting the final results to the user device. The "Ranking Candidate Pick Up" in FIG. 3 refers to the process where the ranking component 314 selects or picks up potential search results from these search indexes 320. These "ranking candidates" are the pieces of content (for example URLs, documents, and media) that might be relevant to the user's query and/or scenarios in 302. The ranking component 314 gathers these candidates so it can apply its final ranking and prioritization algorithms. The goal is to determine which of these candidates are most relevant and should appear at the top of the search results. Once the ranking component 314 picks up the ranking candidates from the search indexes: it prioritizes these candidates based on factors like relevance, user context, query specifics, the scenarios in 302, and/or possibly real-time dynamics, the ranking component 314 assigns a final rank to each candidate, ordering them in a way that best matches the user's query and expected intent. The ranking component 314 compiles the final list of search results that will be presented to the user, ensuring that the most relevant and useful results are prioritized.

The search indexes 320 store a vast amount of content, but not all of it is equally relevant to every query. The ranking component 314's job is to ensure that only the most relevant, high-quality content is surfaced and ranked appropriately. By pulling ranking candidates from multiple specialized indexes in 320, the ranking component 314 can dynamically adjust which content is prioritized based on the specific nature of the query, ensuring a tailored and optimized search experience. The output is presented search results, as indicated in 319.

Figure 4:
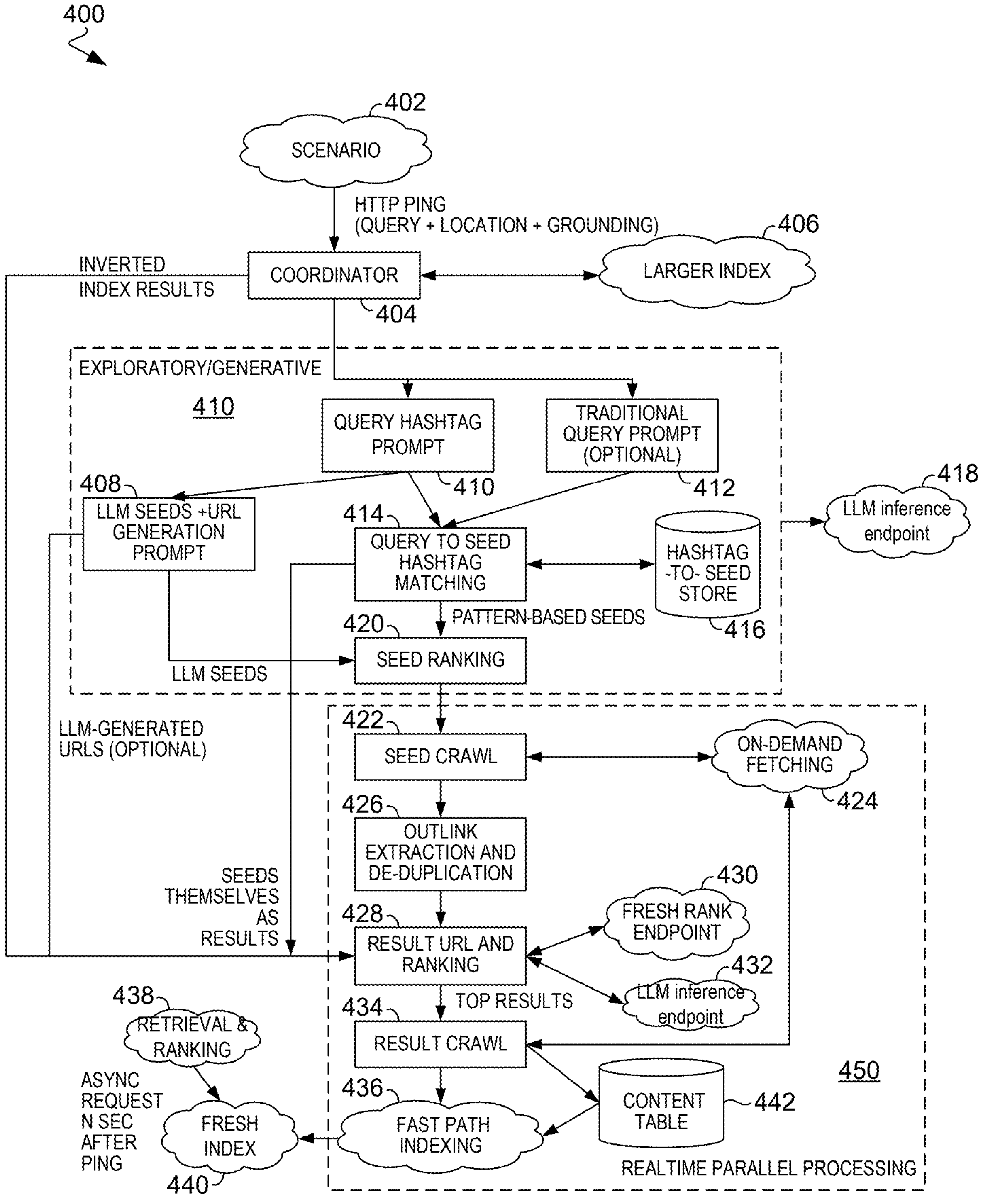
FIG. 4 is a flow diagram of an example process illustrating a more detailed breakdown of the components involved in the bottomless index generation process of FIG. 3, according to some embodiments.

FIG. 4 is a flow diagram of an example process 400 illustrating a more detailed breakdown of the components involved in the bottomless index generation process of FIG. 3, according to some embodiments. In other words, the process 400 expands on the bottomless index service 304, the on-demand crawl and indexing 309, larger index 306, and real-time index 308 as depicted in FIG. 3. The scenario (for example one or more of the scenarios 302) represents the overall context or situation that drives the system's behavior. Different scenarios, such as "deeper search" or "trending queries," dictate how aggressively the system should explore, generate, and rank URLs. In some embodiments, fresh index 440 represents fresh index 312 of FIG. 3, and the larger index 406 represents the larger index 306 of FIG. 3 or the larger index 206 of FIG. 2.

The coordinator 404 takes input from the Scenario 402 to guide the rest of the process. The coordinator 404 is responsible for managing and directing the workflow. It decides which parts of the system to engage based on the scenario 402. It feeds instructions into the Exploratory/generative process 410 and ensures that the process flows smoothly from query to indexing. The exploratory/generative process 410 generates and rank new content for indexing. One of the coordinator 104's roles is to manage the results retrieved from the inverted index (described in more detail below), which focuses on rare or infrequent terms. The inverted index captures niche content that might not be covered by the classic index. The arrow labeled "inverted index results" in FIG. 4 indicates that the coordinator 104 is responsible for sending the URLs retrieved from the inverted index to the Result URL and Ranking module 428. This flow integrates niche results into the overall ranking process. The Result URL and Ranking module 428 takes inputs from multiple sources, including the inverted index. By receiving inverted index results, the ranking module can ensure that niche and specialized content is evaluated and positioned correctly among the broader, mainstream results. The coordinator 404 ensures that URLs identified as relevant from the inverted index are not overlooked or undervalued in the final ranking process. This integration enables the system to highlight both niche content (from the inverted index) and popular content (from the classic index) effectively. Integrating results from the inverted index ensures that users receive a diverse set of search results, catering to both broad and specific needs. It enriches the search experience by including niche or less common content that would otherwise be missed. The query hashtag prompt 411 is received by a language model to generate hashtags based on the user's query. These hashtags help match the query to relevant content by linking it to predefined categories or topics that are stored in the hashtag-to-seed Store 416. Traditional Query Prompt (Optional) 412 generates a traditional search query prompt, which is for fallback or additional exploration, based on typical query structures. Query to seed hashtag matching 414 matches the generated query hashtags with pattern-based seeds stored in the system (for example a pattern database). These seeds are predefined URLs or content sources that are known to be relevant to specific hashtags. For example, 414 compares the query's hashtags against the stored patterns to identify which patterns are most likely to be relevant. This involves checking if the hashtags match the predefined tags or topics associated with each pattern in the database (for example via Jaccard index, cosine similarity, TF-IDF, fuzzy matching, and/or semantic matching, such as via BERT). After matching the hashtags with patterns, 414 ranks these patterns based on their relevance to the query. Patterns that match more hashtags or match more significant (higher-weight) hashtags are prioritized.

The hashtag-to-seed store 416 is a database that stores mappings between hashtags and seeds (specific URLs or content sources). It allows the system to quickly identify which content is likely to be relevant based on the hashtags generated from the query. With respect to seed ranking, once seeds are identified through hashtag matching, they are ranked (i.e., seed ranking 420) based on their relevance to the query. This ranking determines which seeds will be prioritized in the crawling and indexing process. For example, a weighted scoring algorithm (for example Best Matching (BM) 25) can effectively rank seeds by assigning scores based on the importance and frequency of matched hashtags, as well as the quality of the seed content. This ensures that the most relevant and high-quality seeds are prioritized for crawling and indexing, ultimately leading to better search results for the user.

The LLM seed/URL generation prompt 408 uses a Large Language Model (LLM) to generate new seed URLs based on the user's query and the context provided by the coordinator 404. These seeds might not be directly available in the larger indexes and are created to discover new content. This process involves leveraging the LLM's understanding of language, patterns, and relationships between concepts to create URLs that are plausible and relevant, even if they do not already exist in the system's database. For example, a user queries for "best practices in AI model deployment for healthcare in 2024." The "Scenario in 402 is that the user is likely looking for the latest best practices specific to healthcare and AI deployment, possibly with an emphasis on regulations, practical guides, or case studies. The user is in the United States, indicating that content relevant to the U.S. healthcare system might be prioritized. The query Intent is that the user is likely seeking actionable insights or resources that can be applied in a professional or academic context. The system constructs a detailed prompt 408 to the LLM, incorporating the query and contextual data provided by the coordinator 404. For example, such prompt may be "Generate URLs that are likely to contain relevant content for the query: 'best practices in AI model deployment for healthcare in 2024'. The user is located in the United States and is likely looking for practical guides, regulations, case studies, or recent research specific to the U.S. healthcare system. Focus on authoritative sources, recent publications, and relevant government or institutional websites." The LLM processes this prompt, using its vast training on text data, including patterns from existing URLs, common structures of website paths, and its understanding of the relationships between concepts in the query. Based on the input prompt in 408, the LLM generates potential URLs that could plausibly exist and lead to relevant content. These URLs are not pulled from an existing database but are instead constructed by the LLM to reflect the types of content that might exist based on the user's query and context. The generated URLs are then passed through a validation step, where they are checked against a pattern database to see if similar structures exist, or if they are similar to URLs that typically lead to high-quality content. If validated, these URLs are treated as new seed URLs that can be crawled and indexed, even if they were not initially present in the system's existing index.

Real-time parallel processing in 450 handles the actual crawling, extraction, and ranking of the content based on the seeds generated in the exploratory/generative process 410. In seed crawl 422, the system initiates crawling of the selected and ranked seeds from 420. This involves fetching content from the URLs identified in the previous steps. With respect to outlink extraction and de-duplication 426, after crawling the seed URLs, the system extracts outlinks (links found within the crawled content) and removes any duplicates to avoid redundancy in the index (for example based on fuzzy matching, syntax matching, Jaccard index, etc.).

With respect to result URL and ranking 428, the URLs extracted are ranked based on their relevance, which could involve re-ranking based on the user's query, context, and/or additional factors. For example, for a query like "AI-driven diagnostic tools for early cancer detection in 2024," the system analyzes factors such as semantic match to the query, content freshness, and source authority. A URL from "cancer.org" specifically addressing AI diagnostics for early cancer detection in 2024 would be ranked highest due to its direct relevance, timeliness, and trustworthy source. In contrast, a more general healthcare AI article or an older piece, even from a reputable source, would be ranked lower. This process ensures that the most relevant and up-to-date content appears at the top of the search results.

In the result crawl 434, the top-ranked URLs are crawled again to ensure that the most relevant content is thoroughly explored and ready for indexing. Using the illustration above, for example, after the initial ranking process for a query like "AI-driven diagnostic tools for early cancer detection in 2024," the system identifies a URL from cancer.org as highly relevant. The result crawl 434 then revisits this URL to deeply explore all available content on the page, such as detailed articles, embedded links, and related resources. This ensures that any valuable information that might have been missed during the first crawl is captured. For instance, if the page contains a recent report or linked studies on AI in healthcare that were not fully processed initially, the result crawl 434 will capture this information, ensuring it is ready for indexing and can be easily retrieved in future search queries.

Fast path indexing 436 represents a fast-tracking mechanism that prioritizes certain URLs for immediate indexing and retrieval, ensuring that high-value or time-sensitive content is quickly available in the search results. The content table 442 is the repository where content that has passed through the fast path indexing 436 is stored and managed. It ensures that this content is quickly accessible for inclusion in search results. Retrieval & Ranking 438 is responsible for retrieving and ranking search results based on a query. It involves scoring content based on relevance and other ranking factors. Fresh Index 440 deals with indexing new or updated content to ensure that the latest data is available for retrieval. In some embodiments, the fresh index 440 operates asynchronously, triggered after a new content update is detected. Result Crawl 434 involves crawling the top results. This means collecting data or content from identified top-ranked sources to update or validate the information. Fast Path Indexing 436 focuses on quickly indexing content from the result crawl 434, ensuring that the freshest and most relevant content is rapidly made available in the system. Content Table 442 is a storage system where the indexed content is stored. It acts as a database that holds all the information indexed by the system, making it accessible for retrieval when needed.

LLM inference endpoints 418 and 432 along with on-demand fetching 424 are used for the on-demand fetching of the processed content. It supports the real-time processing and storage needs of the system. The LLM inference endpoints 418 and 432 refers hosted services or API endpoints that allow users to interact with a Large Language Model (LLM) by sending input data (such as text) and receiving the model's output (like generated text, predictions, or completions). This setup may be managed by a cloud provider or a company offering AI services, such as Azure. The fresh rank endpoint 430 is a component that applies a final, real-time ranking to freshly crawled or newly discovered content, ensuring that the most up-to-date and relevant information is prioritized in the search index. This process is useful for maintaining the timeliness and relevance of search results, especially in fast-changing fields like AI and healthcare. For instance, the fresh rank endpoint takes newly crawled URLs related to a query, such as "latest AI advancements in 2024 for medical diagnostics," and applies a final, real-time ranking. For example, if the system crawls a URL containing a recently published study on AI in diagnostics, the endpoint 430 re-evaluates this content based on its recency, relevance, and/or importance. This ensures that the most up-to-date and significant information is prioritized, so when users search for this topic, the freshest, most relevant results are at the top of the search results.

To summarize, the process 400 begins with the coordinator 404 managing the workflow based on the scenario, feeding into the exploratory/generative process 410. This section handles the generation and matching of seeds, as well as the initial ranking, feeding into the real-time parallel processing 450. This component crawls the selected seeds, extracts and ranks URLs, and ensures that the most relevant content is quickly indexed and available for search results. The LLM inference endpoints 432, 418 and fast path indexing 436 and content table 442 handle the storage, ranking, and fast-path processing of content, ensuring that everything is efficiently managed and available for real-time search queries.

Figure 5:
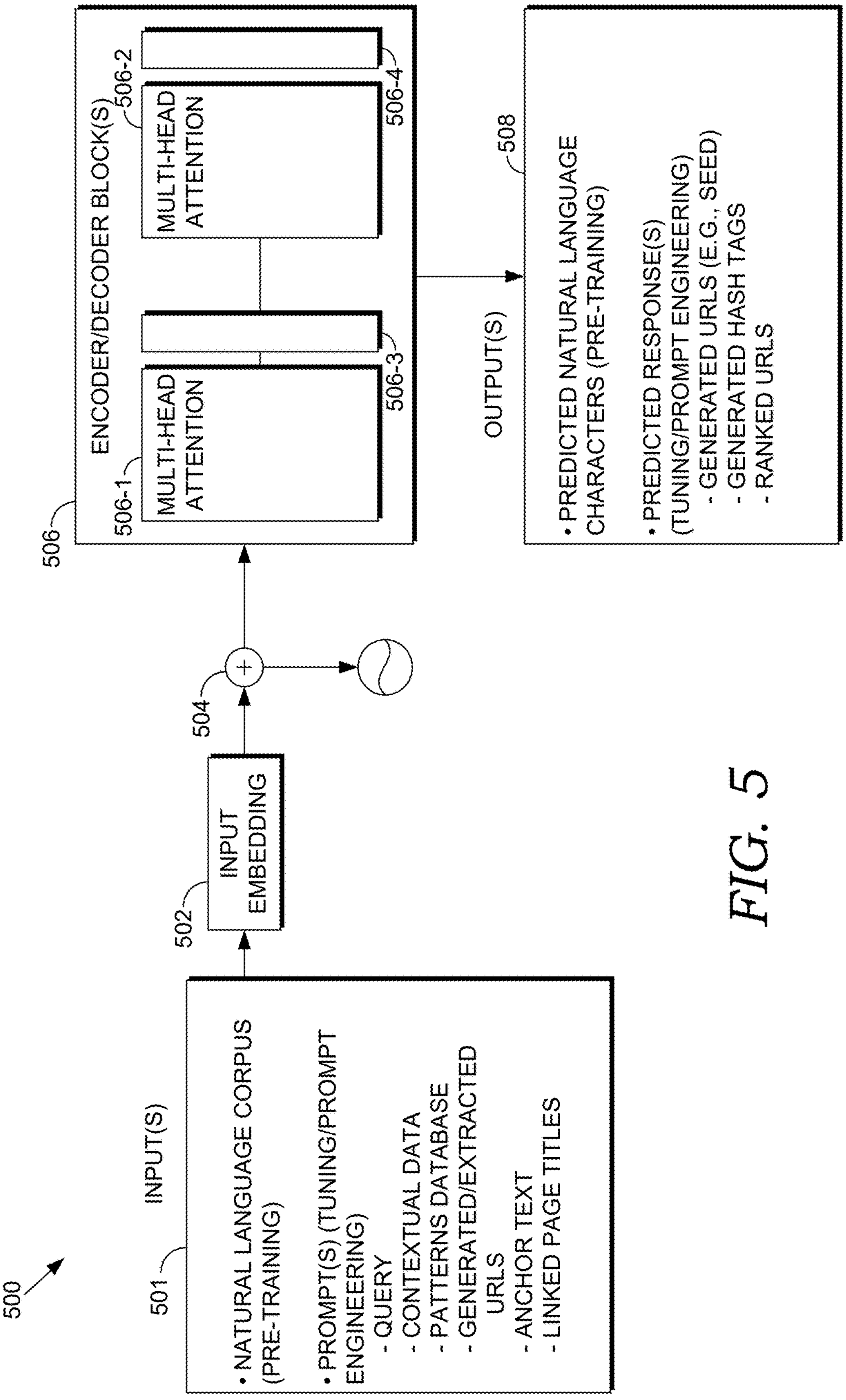
FIG. 5 is a block diagram of a Large Language Model that uses particular natural language input(s) to generate corresponding natural language output(s), according to some embodiments.

FIG. 5 is a block diagram of a Large Language Model 500 (for example a BERT model or GPT-4 model) that uses particular natural language input(s) to generate corresponding natural language output(s), according to some embodiments. In some embodiments, this model 500 represents or includes the functionality as described with respect to the URL generation module 104 of FIG. 1, an LLM that processes the query hashtag prompt 411 of FIG. 4, and/or the pre-ranking module 108 of FIG. 1. In various embodiments, the LLM 600 includes one or more encoders and/or decoder blocks 606 (or any transformer or portion thereof).

At a first time, the inputs 501 are converted into tokens and then feature vectors are embedded into an input embedding 502 (for example to derive meaning of individual natural language words (for example, English semantics) during pre-training). In some embodiments, each word or character in the input(s) 501 is mapped into the input embedding 502 in parallel or at the same time, unlike existing long short-term memory (LSTM) models, for example. The input embedding 502 maps a word to a feature vector representing the word. A positional encoder 504 is a vector that gives context to words (for example, "apple") based on a position of a word in a sentence. For example, with respect to a message "I just sent the document," because "I" is at the beginning of a sentence, embodiments may indicate a position in an embedding closer to "just," as opposed to "document." Some embodiments use a sign/cosine function to generate the positional encoder vector 504 as follows:

$$PE_{(pos,2i)} = \sin\left(pos/10000^{2i/d_{model}}\right)$$

$$PE_{(pos,2i+1)} = \cos\left(pos/10000^{2i/d_{model}}\right).$$

After passing the input(s) 501 through the input embedding 502 and applying the positional encoder 504, the output is a word embedding feature vector (for example a 1D numerical sequence), which encodes positional information or context based on the positional encoder 504. These word embedding feature vectors are then passed to the encoder and/or decoder block(s) 506, where it goes through a multi-head attention layer 506-1 and a feedforward layer 506-2. The multi-head attention layer 506-1 is responsible for focusing or processing certain parts of the feature vectors representing specific portions of the input(s) 501 by generating attention vectors. For example, in Question Answering systems, the multi-head attention layer 506-1 determines how relevant the ith word is for answering the question (for example "generate an appropriate URL given the query") or relevant to other words in the same or other queries, the output of which is an attention vector. For every word, some embodiments generate an attention vector, which captures contextual relationships between other words in the same sentence or other sequence of characters. For a given word, some embodiments compute a weighted average or otherwise aggregate attention vectors of other words that contain the given word (for example, other words in the same line or sentence) to compute a final attention vector.

In some embodiments, a single headed attention has abstract vectors Q, K, and V that extract different components of a particular word. These are used to compute the attention vectors for every word, using the following formula:

$$Z = softmax\left(\frac{Q.K^{T}}{\sqrt{\text{Dimension of vector } Q, K \text{ or } V}}\right)\cdot V$$

For multi-headed attention, there may be multiple weight matrices Wq, Wk and Wv, so there are multiple attention vectors Z for every word. However, a neural network may only expect one attention vector per word. Accordingly, another weighted matrix, Wz, may be used to make sure the output is still an attention vector per word. In some embodiments, after the layers 506-1 and 506-2, there is some form of normalization (for example, batch normalization and/or layer normalization) performed to smoothen out the loss surface making it easier to optimize while using larger learning rates.

Layers 506-3 and 506-4 represent residual connection and/or normalization layers where normalization re-centers and re-scales or normalizes the data across the feature dimensions. The feedforward layer 506-2 is a feed forward neural network that is applied to every one of the attention vectors outputted by the multi-head attention layer 506-1. The feedforward layer 506-2 transforms the attention vectors into a form that may be processed by the next encoder block or by making a prediction at 508. For example, given that a query includes first natural language sequence "generate a URL for a website that sells energy drinks" the encoder/decoder block(s) 506 predicts that the next natural language sequence or answer will be "www.energy-drink.com."

In some embodiments, the encoder/decoder block(s) 506 is trained to learn language (pre-training) and make corresponding predictions. In some embodiments, the encoder/decoder block(s) 506 first learns what language and context for a word is in pre-training by training on two unsupervised tasks—Masked Language Modeling (MLM) and Next Sentence Prediction (NSP)—simultaneously. In terms of the inputs and outputs, at pre-training, the natural language corpus of the inputs 501 may be various historical documents, such as textbooks, journals, web data, and/or periodicals in order to output the predicted natural language characters in 508 (not make the predictions at tuning/prompt engineering at this point). The encoder/decoder block(s) 506 takes in a sentence, paragraph, or sequence (for example, included in the input(s) d01), with random words being replaced with masks. The goal is to output the value or meaning of the masked tokens. For example, if a line reads, "please [MASK] this document promptly," the prediction for the "mask" value is "send." This helps the encoder/decoder block(s) 506 understand the bidirectional context in a sentence, paragraph. In the case of NSP, the encoder/decoder block(s) 506 takes, as input, two or more elements, such as sentences, lines, or paragraphs and determines, for example, if a second sentence in a document follows (for example, is directly below) a first sentence in the document. This helps the encoder/decoder block(s) 506 understand the context across all the elements of a document, not just within a single element. Using both of these together, the encoder/decoder block(s) 506 derives a good understanding of natural language during pre-training.

In pre-training, the output is typically a binary value C (for NSP) and various word vectors (for MLM). With training, a loss (for example, cross entropy loss) is minimized. In some embodiments, all the feature vectors are of the same size and are generated simultaneously. As such, each word vector may be passed to a fully connected layered output with the same number of neurons equal to the same number of tokens in the vocabulary.

In some embodiments, once pre-training is completed, the encoder/decoder block(s) 506 performs prompt engineering and/or tuning (for example prompt-tuning, and/or fine tuning). For example, for fine tuning, some embodiments perform a QA task by adding a new question-answering (for example a question-URL pair) head or encoder/decoder block in 506, just the way a masked language model head is added (in pre-training) for performing a MLM task, except that the task is a part of fine-tuning to add new input data in the input(s) 501 (i.e., the query, contextual data, patterns database, generated/extracted URLs, anchor text, and/or linked page titles) and adjust the weights formulated during pre-training. In other words, fine-tuning adds additional input data (i.e., the specific prompts in the input(s) 501 that are not part of pre-training), output tokens, and performs additional rounds of training to further adjust weights to formulate the output(s) 608 that are not part of pre-training. For example, with respect to question-answer pairs, some embodiments mask the question to test the model's knowledge of what each sequence in the question belongs to what prompt/question or use a form of NSP to predict the next sentence or word.

Prompt engineering is the process of guiding and shaping ML model responses (for example the predicted response(s) in the output(s) 508) by relying on the user, or prompt engineer, to craft more carefully phrased and specific queries or prompts. With prompt engineering, the weights are frozen (i.e., its values remain the same from pre-training) such that they are not adjusted during prompt engineering. A "prompt" as described herein may include one or more of the inputs in 501, code snippets, mathematical equations, one or more examples (for example one-shot or two-shot examples), a hard prompt or template, and/or a numerical embedding (for example a "soft" prompt). In some embodiments, an "example" is indicative of few-shot prompting, which is a technique used to guide large language models (LLMs), like GPT-3, towards generating desired outputs by providing them with a few examples of input-output pairs.

The prompt engineering process often involves iteratively asking increasingly specific and detailed questions/commands/instructions or testing out different ways to phrase questions/commands/instructions. The goal is to use prompts to elicit better behaviors or outputs as indicated in the predicted response(s) of the output(s) 508 from the model. Prompt engineers may experiment with various types of questions/commands/instructions and formats to find the most desirable and/or relevant model responses. For example, a prompt engineer may initially provide a prompt (for example "rank these URLs based on their relevance"). However, this may not be specific enough/or may elicit the wrong predicted response(s) in 508 (for example ranking URLs the highest when they are relevant only to the query), so the prompt engineer may formulate another prompt template that states, "rank URLs the highest, when the contextual data includes geographic data X or market data Y, and then rank URLs lower than are merely relevant to the query"). The prompt engineer may be satisfied with this prompt. Subsequent to this satisfactory answer, particular embodiments save the corresponding event data prompt as a template. In this way, the prompt template (for example a "hard" prompt) may be used at runtime or when the model is deployed.

Prompt tuning is the process of taking or learning the most effective prompts or cues (among a larger pool of prompts) and feeding them to the encoder/decoder block(s) 506 as task-specific context. For example, a common question or phrase—"what is the optimization objective?"—could be taught to the encoder/decoder block(s) 506 to help optimize the model and guide it toward the most desirable decision or corresponding outputs in the predicted response(s) of 508. Unlike prompt engineering, prompt tuning is not about a user formulating a better question/command or making a more specific request. Prompt tuning means identifying more frequent or important prompts (for example which have higher node activation weight values) and training the encoder/decoder block(s) 506 to respond to those common prompts more effectively with correct predicted response(s). The benefit of prompt tuning is that it may be used to modestly train models without adding any more input(s) 501 or prompts (unlike fine-tuning), resulting in considerable time and cost savings.

In some embodiments, prompt tuning may use soft prompts only, and may not include the use of hard prompts. Hard prompts are manually handcrafted text prompts (for example prompt templates) with discrete responses, which are typically used in prompt engineering. Prompt templating allows for prompts to be stored, re-used, shared, and programmed. Soft prompts are typically created during the process of prompt tuning. Unlike hard prompts, soft prompts are typically not viewed and edited in text. Soft prompts typically include an embedding, a string of numbers that derives knowledge from the encoder/decoder block(s) 506 (for example via pre-training). Soft prompts are thus learnable tensors concatenated with the input embeddings that may be optimized for a dataset. In some embodiments, prompt tuning creates a smaller light weight model (for example not the LLM 500) which sits in front of the frozen pre-trained model (i.e., the LLM 500 with weights set during pre-training). Therefore, prompt tuning involves using a small trainable model before using the LLM 500. The small model is used to encode the text prompt and generate task-specific virtual tokenized tokens. These virtual tokenized tokens are pre-appended to the prompt and passed to the LLM 500. When the tuning process is complete, these tokenized virtual tokens are stored in a lookup table (or other data structure) and used during inference, replacing the smaller model.

In some embodiments, the prompt(s) in input(s) 501 and/or the predicted response(s) in the output(s) 508 correspond to concepts described herein. For example, in order to generate the URLs (for example including a seed URL) in the output(s) 508, the LLM receives the following inputs—in 501: Query, contextual Information (for example location data, such as the user's geographical location can influence the relevance of certain URLs, especially for region-specific content and market data, such as information about the market or industry relevant to the query.), the inferred intent behind the query, such as whether the user is looking for educational content, purchase options, technical documentation, etc., Patterns/Database of Patterns (for example predefined URL patterns or templates that are common for certain types of content (for example https://www.example.com/search?q={QUERY}), and/or generated hashtags that summarize the query's key topics or themes, which can help in narrowing down relevant URL patterns.

In some embodiments, where URLs are generated, the LLM is trained using a supervised learning approach, where it learns to generate URLs by being exposed to a large corpus of input-output pairs that reflect realistic and relevant URL structures. For example, some embodiments collect a large dataset of web pages that include the URLs, titles, anchor text, and associated content. A labeler would then label the dataset with the corresponding queries, contextual data, and/or desired URLs (for example search results, seed URLs). With respect to input-output pairs for training, the input is, in some embodiments, a combination of the user query, contextual data, and relevant patterns. The output is the target URL that the model should generate. In supervised learning the LLM is trained by minimizing the error between the predicted URLs and the actual URLs in the training dataset. This involves, in some embodiments, backpropagation and gradient descent to adjust the model's weights. In some embodiments, the LLM is trained in a sequence-to-sequence framework, where the input sequence (query and context) is mapped to an output sequence (URL). This allows the model to generate URLs in a step-by-step manner, considering each part of the URL structure as it is generated.

In some embodiments, when a query is received, the LLM 500 processes the input (query text, context, and patterns) to understand the intent and determine the most likely relevant URL structures. In some embodiments, the LLM 500 uses the provided patterns or templates to guide the structure of the URLs it generates. If a pattern is matched, the LLM 500 fills in the variables (for example {QUERY}) with appropriate terms derived from the query. The LLM 500 outputs a list of generated URLs that are likely to exist or lead to relevant content. These URLs are then validated or directly used as seed URLs for further crawling and indexing.

Alternatively or additionally, the LLM generates one or more hash tags, as illustrated in the output(s) 508. In some of these embodiments, the inputs in 501 for hashtag generation are query, contextual data, query intent, pattern/domain-specific knowledge (where domain knowledge is redefined knowledge about the domain or industry (for example medical, technological, legal) can help generate more accurate hashtags), and/or semantic relationships (for example understanding of how terms are semantically related to one another, which can influence which hashtags are generated).

To train the LLM 500 to generate hashtags, a supervised learning approach is used in some embodiments, where the LLM 500 learns to associate specific queries with the most relevant hashtags based on historical data. Some embodiments first collect a large dataset containing user queries, associated contextual data, and the hashtags that were either manually or automatically assigned to those queries. Each dataset entry is labeled with the correct hashtags that correspond to the query and context. These input-output pairs are used for training, where the input is a combination of the user query, contextual data, and any relevant domain-specific information. The output is the target hashtags that the model should generate. In some embodiments, the LLM 500 is trained by minimizing the difference between the hashtags it generates and the actual hashtags in the training dataset. This involves adjusting the model's parameters through backpropagation and gradient descent in some embodiments. In some embodiments, sequence-to-sequence modeling is used. When a query is received, the LLM 500 processes the input (query text, context, and domain knowledge) to identify the main topics and concepts that need to be represented in the hashtags. The LLM 500 generates hashtags by leveraging its understanding of the semantic relationships between words and concepts in the query. It uses the input query and context to predict which hashtags would best represent the query's content. The LLM 500 outputs a list of hashtags that capture the essence of the query. These hashtags are then used to match the query with relevant content or seed URLs in the search process.

The Large Language Model (LLM) 500 can also be employed to rank URLs, as indicated in the output(s) 508, by evaluating their relevance to a user's query, among other factors. This process involves analyzing various factors such as the semantic content of the URLs, the context provided by the query, and/or other metadata like anchor text and page titles. The LLM 500 is trained on large datasets of queries and corresponding ranked URLs, and learns to assign relevance scores that determine the order in which URLs should be presented in search results.

To train the LLM 500 to rank URLs, a supervised learning approach is used in some embodiments, where the model learns from a dataset of queries and the corresponding ranked lists of URLs. The training process involves associating certain input features with higher or lower relevance scores, based on historical data. Various embodiments first collect a large dataset of search queries, each associated with a set of URLs that have been manually or automatically ranked by relevance. Each URL in the dataset is labeled with a relevance score or rank that reflects its importance relative to the query. With respect to the input-output pairs for training, the input is a combination of the user query, contextual data, and metadata for each URL (anchor text, page titles, content). The output is a relevance score or rank indicating how well the URL matches the query. In some embodiments, the LLM is trained to minimize the error between the predicted relevance scores and the actual scores in the training dataset. This involves using loss functions like Mean Squared Error (MSE) to measure the difference between predicted and actual relevance scores. In some embodiments, the LLM 500 is trained with a ranking-specific loss function, such as Pairwise Ranking Loss, which directly optimizes the model for producing correct rankings rather than just relevance scores. In some embodiments, the LLM 500 learns to rank URLs by processing them in sequence and comparing their relevance to the given query. When a query is received, the LLM 500 processes the input (query text, contextual information, and URL metadata) to evaluate how well each URL matches the user's intent. The LLM 500 assigns a relevance score to each URL based on its analysis of the content, anchor text, page titles, and how well these align with the user's query and context. The URLs are then ranked based on their relevance scores, with higher scores indicating greater relevance. The top-ranked URLs are presented first in the search results.

Figure 6:
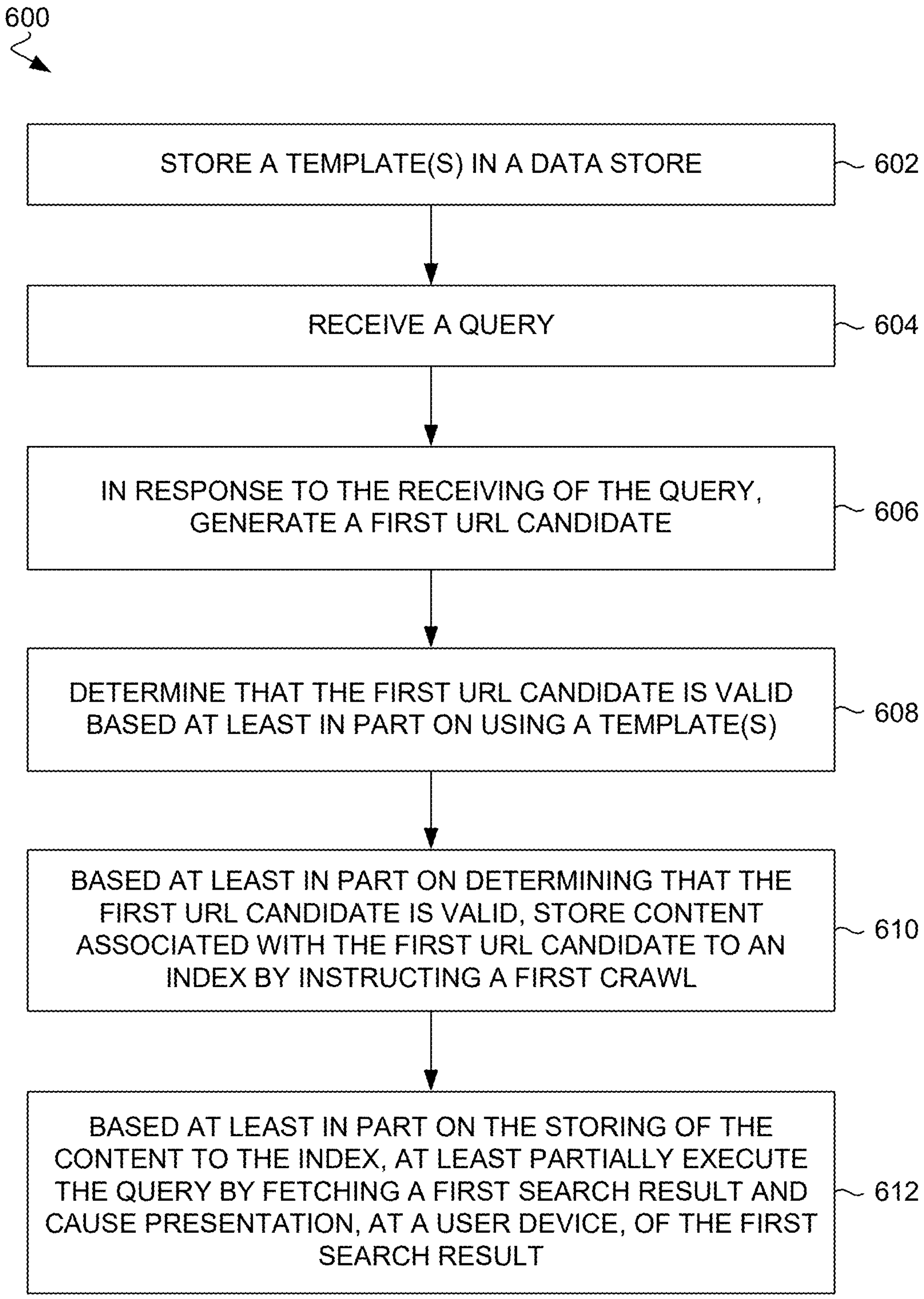
FIG. 6 is a flow diagram of an example process for generating and validating a candidate URL to execute a query, according to some embodiments.

FIG. 6 is a flow diagram of an example process 600 for generating and validating a candidate URL to execute a query, according to some embodiments. The process 600 (and/or any of the functionalities described herein) is performed by processing logic that comprises hardware (for example, circuitry, dedicated logic, programmable logic, microcode, and the like), software (for example, instructions run on a processor to perform hardware simulation), firmware, or a combination thereof. Although particular blocks described in this disclosure are referenced in a particular order at a particular quantity, it is understood that any block can occur substantially parallel with or before or after any other block. Further, more (or fewer) blocks can exist than illustrated. Added blocks can include blocks that embody any functionality described herein (for example, as described with respect to FIGS. 1-5). The computer-implemented method, the system (that includes at least one processor and at least one computer readable storage medium), and/or the computer readable medium as described herein can perform or be caused to perform the process 600 or any other functionality described herein.

Per block 604, some embodiments first receive a query, such as a user-issued search engine query of natural language text. Per block 606 in response to the receiving of the query, some embodiments generate a first URL candidate. A "URL candidate" as described herein is a potential URL generated, retrieved, or identified by the system for further crawling, ranking, and indexing, based on its relevance to the user's query and context. A URL candidate may be generated or identified by the system but hasn't yet been fully validated, crawled, or confirmed to exist. The term "potential" reflects that it is a URL that could lead to relevant content, but its final status or content relevance is determined through subsequent processes like crawling, validation, and/or ranking.

In some embodiments, block 606 includes the functionality as described with respect to the URL generation module 104. In some embodiments the first URL candidate is generated based on using a pattern database. A "pattern database" is a repository that stores pre-defined URL templates and/or associated tags, which are used to generate and validate URL candidates based on their relevance to user queries. For example, based at least in part on the query, some embodiments generate a set of tags (for example hashtags) that represent likely content topics related to the query. Some embodiments then match the set of tags against pre-generated tags associated with each site, of a plurality of sites. And based on a site with a highest score/value of matching tags, some embodiments generate the first (and/or second) URL candidate by populating at least one of at least one URL template, of the plurality of URL templates. Such "score" or value in some embodiments is derived a using a matching function (e.g. BM25).

In an illustrative example, consider the user query, "AI tools for early cancer detection in 2024." Based on this query, various embodiments generate a set of hashtags such as #AITools, #CancerDetection, #2024, and #HealthcareInnovation. These tags represent likely content topics related to the query and help the system identify relevant sites. Various embodiments employ a database containing multiple sites, each associated with pre-generated tags (hashtags) and URL templates. For example:

Site 1 Example: https://www.medtechjournal.com/search?q={QUERY}

Tags: #Healthcare, #MedicalTechnology, #AITools, #2024

Site 2 Example: https://www.cancerresearch.org/articles?q={QUERY}

Tags: #CancerDetection, #Oncology, #2024, #Research

Various embodiments then matches (for example via TF-IDF, fuzzy matching, Jaccard Index, cosine distance) the set of generated tags (#AITools, #CancerDetection, #2024, #HealthcareInnovation) against the pre-generated tags associated with each site in the database. In this example: Site 1 might match tags like #AITools, #2024, and #Healthcare. Site 2 might match tags like #CancerDetection, #2024, and #Oncology. If Site 2 has the highest quantity of matching tags, it is selected as the most relevant site for generating the URL candidate. Based on the selected site (Site 2 in this case), some embodiments generate a URL candidate by populating the template with the relevant query information. For example: Template: https://www.cancerresearch.org/articles?q={QUERY}. Populated URL Candidate: https://www.cancerresearch.org/articles?q=AI%20tools%20for%20early%20cancer%20detection%20in%202024. This URL candidate is now ready for further validation, crawling, and indexing, as it is likely to lead to relevant content based on the user's query.

Some embodiments provide contextual data that includes at least one of location data or market data as second input into the language model, where the language model generates the candidate URL based further on the contextual data at block 606. This contextual data enables the LLM to generate URL candidates that are specifically tailored to the user's geographical area or industry, resulting in more relevant and context-aware search results. For example, a query like "AI tools for healthcare diagnostics in 2024" causes generation of a URL such as https://www.healthcare-ai.com/usa/diagnostics/ai-tools-2024, relevant to a user in the USA.

Per block 608, some embodiments determine that the first URL candidate is valid based at least in part on using the one or more templates. A "valid" URL candidate means that the URL is syntactically correct, likely to exist, and/or leads to relevant and accessible content. With respect to syntax, the URL follows the correct format and structure, including the proper use of protocols (for example https://), domain names, paths, and query parameters. With respect to being likely to exist, the URL points to a real web or other page (for example an app page) that can be accessed and does not return errors like "404 Not Found." This often involves checking whether the URL resolves to an active page. With respect to relevance, the content of the page linked by the URL is relevant to the user's query and meets the intended purpose for which the URL was generated. In some embodiments, a URL is valid based on its quality and trustworthiness—the content associated with the URL comes from a credible and authoritative source, ensuring that the information provided is reliable and useful. Validation is a useful step to ensure that the generated URL candidates are not only correctly formatted but also lead to meaningful and accessible content, making them suitable for further crawling, indexing, and presentation to the user.

In some embodiments, block 608 occurs based on comparing the URL candidate against the one or more templates. In these embodiments, the one or more templates are included in a pattern database. This is a database of known URL patterns or templates, which represent the typical structures of URLs for various websites or content types. These patterns might look like https://www.example.com/search?q={QUERY} or https://www.example.com/{CATEGORY}/{YEAR}. The generated URL candidate is compared against the patterns in the database to determine if it conforms to a known and valid URL structure.

Thus various embodiments check if the URL structure generated by the URL generation module 104, for example, matches any of the predefined templates. If the URL follows a recognized pattern, it is considered structurally valid. In an illustrative example, for the generated URL: https://www.healthcare-ai.com/tools/diagnostics/2024, embodiments find a matching pattern in the database like https://www.healthcare-ai.com/{CATEGORY}/{SUBCATEGORY}/{YEAR}. The match confirms that the structure of the generated URL is valid according to the template (for example based on fuzzy matching, Jaccard index, and/or semantic matching, etc.).

After confirming that the URL matches a known pattern, some embodiments perform an existence check by attempting to resolve the URL to see if it leads to an actual, accessible resource. Various embodiments check for HTTP status codes (like 200 OK) to verify that the URL points to a valid page. For example, some embodiments send a request to this URL and receives a 200 OK status, confirming the page exists. Some embodiments additionally or alternatively assess whether the content of the page linked by the URL is relevant to the user's query. This might involve analyzing the page's metadata, content, and other factors to ensure it aligns with the query intent. For example, some embodiments analyze the page content and determines that it discusses AI tools in healthcare diagnostics for 2024, which is directly relevant to the user's query. If the URL candidate passes the pattern matching, existence, and/or relevance checks, it is considered a valid URL. It can then be used for further crawling, indexing, or directly included in the search results.

In some embodiments, the "patterns database" or templates in a data store (for example any data structure, such as a database) are generated based on extracting real valid URLs. For example, some embodiments first instruct a web crawler to collect a plurality of URLs from a plurality of websites, each URL, of the plurality of URLs including a variable part. A "variable part" refers to the segment of a URL that can change depending on the specific content or parameters being accessed. Unlike the fixed parts of a URL, which are consistent across multiple URLs from the same website (such as the domain name and certain directory paths), the variable part is the portion that varies to point to different resources or data within that structure. In an illustrative example, the web crawler might visit various e-commerce sites and collect URLs like:

https://www.example.com/products/electronics/1234
https://www.example.com/products/books/5678
https://www.shop.com/items/clothing/91011
https://www.shop.com/items/electronics/121314

Some embodiments then identify a common structure or pattern within the plurality of URLs. This involves recognizing parts of the URLs that follow a consistent format across multiple URLs, such as directories, subdirectories, and parameters. For example, some embodiments identify that many URLs from example.com and shop.com have similar structures:

https://www.example.com/products/{CATEGORY}/{ID}
https://www.shop.com/items/{CATEGORY}/{ID}

Here, particular embodiments detect that the URLs share a common pattern where {CATEGORY} and {ID} are variable parts. Particular embodiments then group each URL, of the plurality of URLs, into a respective cluster based at least in part on the common structure or pattern. Each cluster represents a group of URLs that follow the same or a very similar pattern. For example, URLs are grouped into clusters based on their structure:

Cluster 1: URLs like https://www.example.com/products/electronics/1234 and https://www.example.com/products/books/5678 are grouped together because they share the structure https://www.example.com/products/{CATEGORY}/{ID}.

Cluster 2: URLs like https://www.shop.com/items/clothing/91011 and https://www.shop.com/items/electronics/121314 are grouped together because they share the structure https://www.shop.com/items/{CATEGORY}/{ID}. And based at least in part on the grouping, some embodiments generate the plurality of URL templates by at least replacing the variable part of each URL with a placeholder. For example, for Cluster 1, various embodiments create the following URL template: https://www.example.com/products/{CATEGORY}/{ID}. For Cluster 2, some embodiments create this template: https://www.shop.com/items/{CATEGORY}/{ID}. Here, {CATEGORY} and {ID} are the variable parts that have been replaced with placeholders in the template.

Some embodiments associate each URL template with metadata that describes at least one of: usage, type of content each respect URL template retrieves, or a website or category the URL template applies to. Metadata helps embodiments choose the most appropriate URL template for generating a new URL based on the user's query and context. For instance, if the query is related to "technical articles," the system can select a URL template specifically tagged with metadata indicating it retrieves such content. By knowing the type of content a URL template is designed to access, the various embodiments generate URLs that are more likely to lead to relevant and valuable content for the user, improving search results. "Usage" metadata describes how and when a URL template should be used. For example, a template can have usage metadata indicating it is intended for generating URLs that access "product listings" or "user reviews." This helps the system understand the best context for applying the template, ensuring that URLs generated from it are appropriate for the query. "Type of content" describes the nature of the content that the URL template retrieves. For example, a template may be tagged with metadata like "technical articles," "news updates," or "educational content." Website or category metadata indicates the specific website or category the URL template applies to. For example, a template in some embodiments is associated with a particular website like "example.com" or a content category such as "electronics" or "healthcare." This ensures that some embodiments generate URLs that are appropriate for the website or category in question, matching the user's query with the most relevant sources.

Per block 610, based at least in part on determining that the first URL candidate is valid, some embodiments store content as associated with the first URL candidate to an index by instructing a first crawl. For example, after the URL validation module 112 of FIG. 1 validates the URL https://www.healthcare-ai.com/tools/diagnostics/2024, this module 112 instructs the crawling and discovery module 106 to visit this URL, download the page content, and extract any relevant information. After the content is retrieved by the crawling and discovery module 106, the indexing and storage module 114 is responsible for storing this content in the search engine's index. This module organizes and maintains the indexed content, ensuring it can be efficiently retrieved during future searches.

Per block 612, based at least in part on the storing of the content to the index, some embodiments at least partially execute the query by fetching a first search result and cause presentation, at a user device, of the first search result. For example, as described with respect to the query processing and execution module 102, the result integration module 118, and the feedback module 102, particular embodiments execute the query. For example, the query processing and execution module 102 interprets the user's query, retrieves relevant content from the index, and assembles the search results. For example, the user submits a query like "latest AI tools for healthcare diagnostics in 2024." The query processing and execution module 102 analyzes this query, determines the intent, and searches the index for relevant content.

Figure 7:
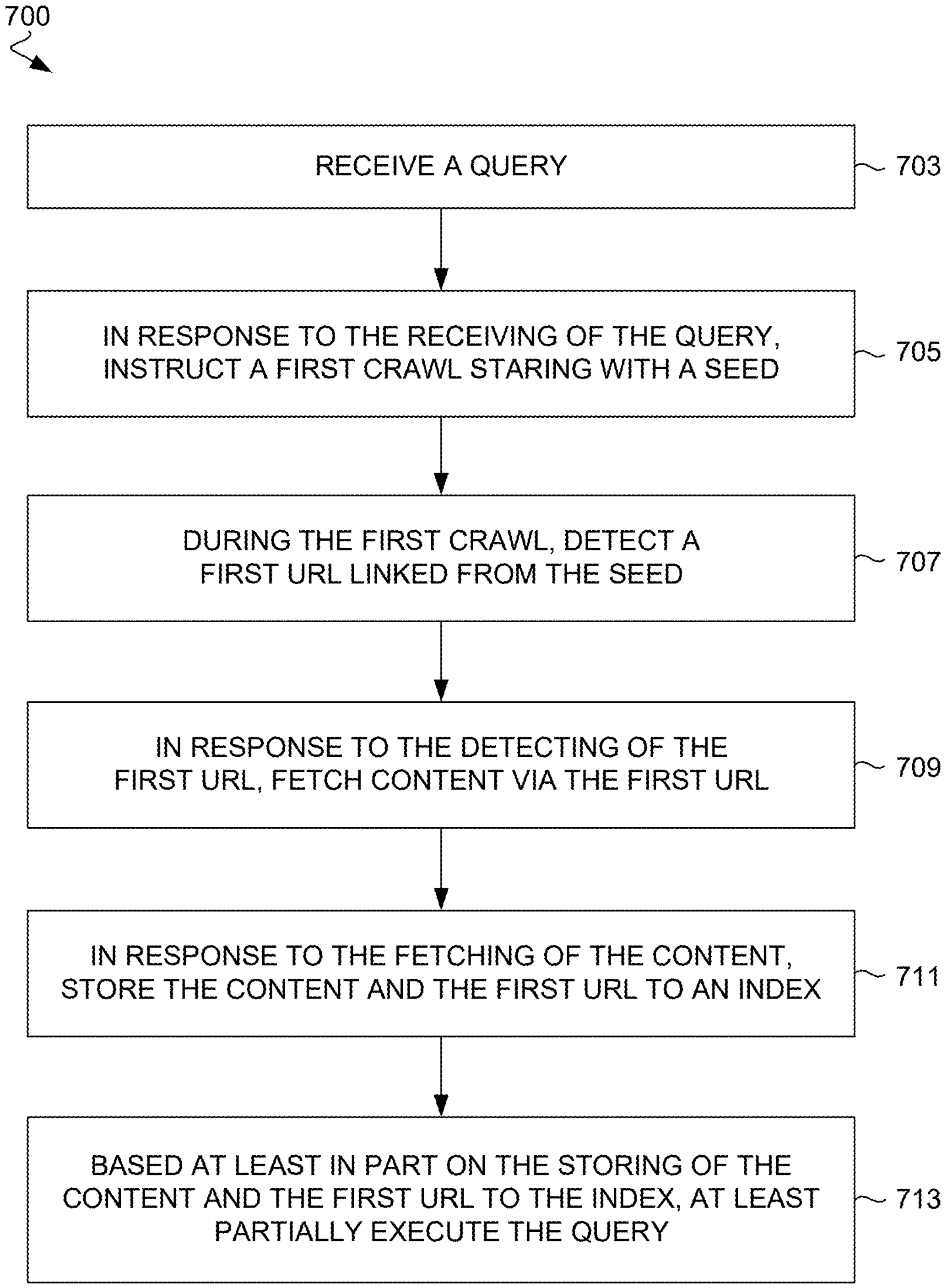
FIG. 7 is a flow diagram of an example process for dynamically discovering new content related to a user's query by starting a crawl from a seed URL, according to some embodiments.

FIG. 7 is a flow diagram of an example process 700 for dynamically discovering new content related to a user's query by starting a crawl from a seed URL, according to some embodiments. In some embodiments, the process 700 represents the functionality performed by the exploratory process module 116. Per block 703, some embodiments first receive a query. First example, the exploratory process module 116 first receives a user submitted query "latest AI tools for healthcare diagnostics in 2024."

Per block 705, in response to the receiving of the query, some embodiments instruct a first crawl staring with a seed. That is, upon receiving the query, some embodiments initiate a web crawl starting from a specific "seed" URL. A seed URL is a known, reliable starting point that is relevant to the user's query. For example, the exploratory process module 116 starts a crawl from the seed URL https://www.healthcare-ai.com because it is known to contain information related to AI in healthcare. In some embodiments, the "seed" refers to the first URL candidate as generated in block 606.

Per block 707, during the first crawl, some embodiments detect a first URL linked from the seed. As the system crawls the content of the seed URL, it identifies other URLs (outlinks) within the page that are relevant to the user's query. This detection is based on the content or context provided by the linked URLs. For example, while crawling https://www.healthcare-ai.com, the system detects a linked URL https://www.healthcare-ai.com/tools/diagnostics/2024 that appears relevant to the query about AI tools for healthcare diagnostics in 2024. Per block 709, in response to the detecting of the first URL, some embodiments fetch content via the first URL. This step involves accessing the page and downloading the content (for example text, images, metadata).

For example, some embodiments fetch the content from https://www.healthcare-ai.com/tools/diagnostics/2024, which includes articles and reports on AI tools used in healthcare diagnostics.

Per block 711, in response to the fetching of the content, some embodiments store the content and the first URL to an index. This indexing makes the content searchable and available for future queries. For example, the system stores the content and URL https://www.healthcare-ai.com/tools/diagnostics/2024 in its index, categorizing it under relevant keywords like "AI tools," "healthcare diagnostics," and "2024." Per block 713, based at least in part on the storing of the content and the first URL to the index, some embodiments at least partially execute the query using the newly indexed content. The system executes the user's query, either fully or partially, and provides the relevant search results to the user. This means the search results may include the newly indexed content that directly answers the user's query. For example, the system processes the user's query "latest AI tools for healthcare diagnostics in 2024" and includes the content from https://www.healthcare-ai.com/tools/diagnostics/2024 in the search results, presenting it to the user as a top match. Various embodiments thus detect relevant URLs during the crawl and immediately fetches and indexes the content in real-time, making it available almost instantly for the query that triggered the process. Traditional search engines often rely on pre-indexed content, which might be outdated or less relevant by the time a user submits a query. New content is typically added to the index only during scheduled updates, not in real-time.

Some embodiments further execute the query by ranking, using a language model, the first URL among a second set of URLs based on at least one of the query, the second set of URLs, or a title of a linked page. If the query is about "AI tools for healthcare diagnostics in 2024" URLs that specifically mention these tools in their content or metadata will be ranked higher. For example, an LLM considers the entire set of URLs and compares them against each other, determining which URLs are more likely to be relevant based on the content they point to. The LLM evaluates factors like keyword frequency, semantic relevance, and/or link structure. For instance, among URLs related to AI in healthcare, those that link to authoritative sources or comprehensive guides might be ranked higher. The LLM additionally or alternatively takes into account the titles of the linked pages. Titles that closely match the query terms or clearly indicate that the content is relevant to the query will positively influence the ranking. For instance, A URL with the title "Top AI Tools for Healthcare Diagnostics in 2024" is likely to be ranked higher than a URL with a more generic title like "Latest AI News."

Some embodiments instruct at least a second crawl of the first URL based at least in part on the ranking. During the second crawl, some embodiments detect a second URL linked from the first URL. In response to the detecting of the second URL, some embodiments then fetch second content from the second URL. And in response to the fetching of the second content, some embodiments update the index with the second content, where the at least partially executing the query is further based at least in part on the updating of the index with the second content. This describes a process of iterative crawling and dynamic indexing that enhances the execution of the user's query by continually discovering and indexing new content. After the first URL is ranked and identified as relevant, the system performs a second crawl on this URL to discover additional linked content (a second URL). The system then fetches the content from this second URL and updates the search index with the new information. The query execution is further refined based on this newly indexed content, ensuring that the search results are continually improved and expanded with the most relevant and up-to-date information.

In some embodiments, during the first crawl (and/or the second crawl) some embodiments identify and eliminating deadlinks and remove duplicate URLs and content to prevent redundancy in search results. With respect to identifying deadlinks, during the crawl, the some embodiments check the status of each URL it encounters. This is done in some embodiments by sending an HTTP request to the URL and analyzing the response. For example, suppose the system encounters a URL like https://www.example.com/old-page. When the system sends a request, it receives a 404 Not Found or 410 Gone response, indicating that the page no longer exists. Upon detecting that a URL is a deadlink (for example it returns a 404 or 410 error), some embodiments mark the URL as invalid and does not include it in the index. If the deadlink was previously indexed, the system removes it from the index to prevent it from appearing in search results. For example, the URL https://www.example.com/old-page is flagged as a deadlink, so the system excludes it from the index, ensuring that it does not show up in future search results, which helps maintain the quality and relevance of the search results.

With respect to detecting duplicate URL, during the crawl, the some embodiments compare newly discovered URLs with those already in the index. The comparison include, for example, the full URL string, canonical URLs (to handle cases where the same content is accessible via different URLs), and/or other identifiers like URL hashes. For example, suppose the system encounters https://www.example.com/page1 and https://www.example.com/page1?ref=affiliate. Both URLs point to the same content, but the query parameter (ref=affiliate) makes the URLs slightly different. The system identifies these as duplicates (for example via Jaccard index, fuzzy matching, and Euclidian distance). If a duplicate URL is detected, some embodiments either ignore the new URL or consolidates it with the already indexed URL, depending on the scenario. This consolidation ensures that only one version of the URL is indexed, preventing redundancy. For example, the system decides that https://www.example.com/page1 is the canonical version and excludes https://www.example.com/page1?ref=affiliate from indexing to avoid duplication.

To detecting duplicate content, even if URLs are unique, some embodiments check for duplicate content by analyzing the content retrieved from the URLs. It may use techniques like content hashing, similarity scoring, or comparing content metadata (for example titles, Meta descriptions). For example, during the crawl, the system encounters two URLs, https://www.example.com/article123 and https://www.blog.com/repost-article123, both hosting the exact same article text. The system calculates content hashes and finds them identical. If duplicate content is found, the system either indexes only one version or flags it as duplicate content and excludes it from the index. This ensures that search results are not cluttered with repetitive information. For example, the system decides to index only the content from https://www.example.com/article123, marking the content from https://www.blog.com/repost-article123 as a duplicate and excluding it from the index.

Figure 8:
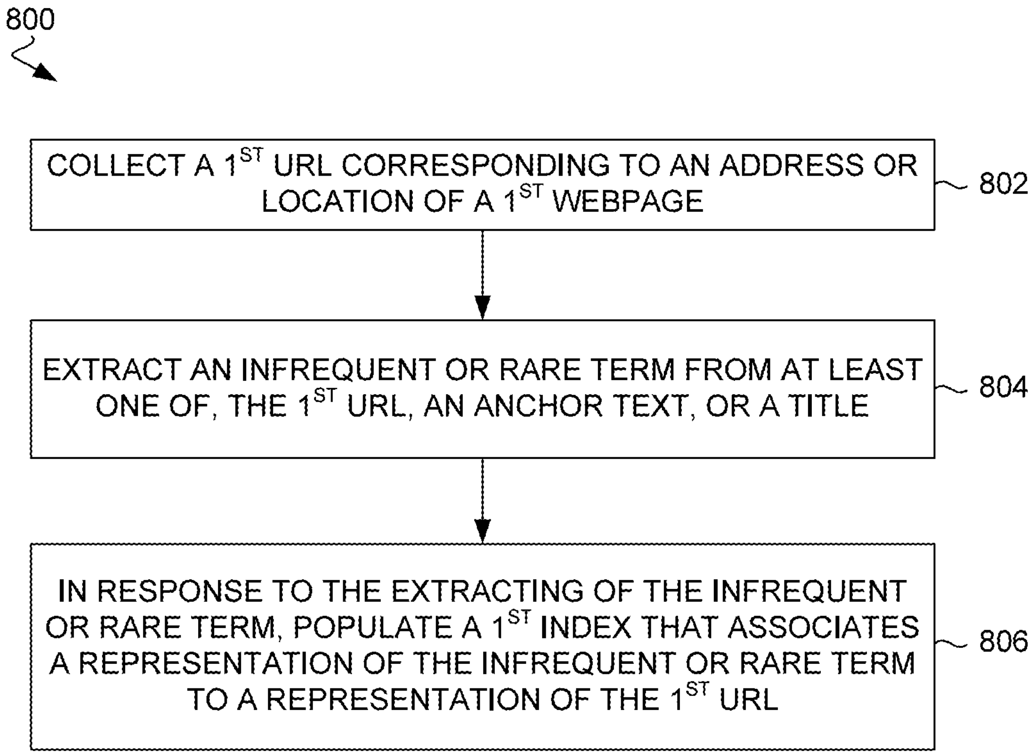
FIG. 8 is a flow diagram of an example process for building an index that associates a representation of an infrequent or rare term to a representation of a URL, according to some embodiments.

FIG. 8 is a flow diagram of an example process 800 for building an index that associates a representation of an infrequent or rare term to a representation of a URL, according to some embodiments. As described herein, various embodiments extend the indexed URL pool (for example to 10 trillion URLs) and use a URL repository built into an inverted index using URLs, anchor text, and/or titles. The process 800 is associated with a focus on infrequent or rare terms. This allows to fetch data when users ask for names, parts, SKUs, IP addresses, or otherwise rare terms (for example unigrams or bigrams) to generally improve recall. URLs are indexed based on URL text itself, and when available, titles, and anchor text. Once a document is successfully crawled, some embodiments store content (or key components of the documents, such as title, summary, etc.) in an offline store.

Per block 802, some embodiments collect a first URL corresponding to an address or location of a first webpage. For instance, this may include or be a part of crawling a computer network to collect multiple URLs at batched intervals. Per block 804, some embodiments extract an infrequent or rare term from at least one of, the first URL, an anchor text, or a title. An "infrequent or rare" terms refers to a word or phrase that appears less frequently across the web or within a specific dataset, making it less common compared to widely used or popular terms. These terms may be found in niche content or specialized webpages and are crucial for capturing specific, long-tail queries that do not rely on broad, mainstream keywords. An "anchor text" is clickable text on a second webpage that links to the first URL. For example, the anchor text is the clickable text in a hyperlink that points to another webpage or URL. It is typically underlined and appears in a different color (often blue) to indicate that it is a link. The anchor text describes or gives context about the destination URL and helps both users and search engines understand what the linked page is about. For instance, if a user is reading an article about vintage car restoration, and within the text, they see the following sentence: "Learn more about restoring a 1950 Buick engine at this restoration guide." Here, the phrase "restoration guide" is the anchor text that links to a URL like https://www.vintagecarblog.com/1950-buick-engine-restoration-guide. When a user clicks the anchor text, they are taken to the page specified by the URL. A "title" is the main heading or label for the webpage. It is typically displayed in the browser tab or at the top of the webpage. It describes the content or subject matter of the page and is an important element for both users and search engines to understand the page's relevance to a query. Titles are also used by search engines to rank and display the page in search results.

In some embodiments, block 804 is performed by calculating the frequency of each term (for example unigram or bi-gram) across a large dataset of webpages. If a term appears infrequently compared to others across this dataset, it is identified as rare. For instance, a term like "1950 Buick straight-eight engine" might appear only in niche forums or specialized car restoration sites, making it a rare term. In some embodiments, the extracting of the infrequent or rare term is based at least in part on computing a frequency with which each unigram or bi-gram appears across a plurality collected URLs, a plurality of anchor texts, and a plurality of titles, and determining whether the frequency is below a threshold (for example a specific number), the plurality of collected URLs includes the first URL, the plurality of anchor texts includes the anchor text, and the plurality of titles includes the title. A "unigram" is a single word or token in a sequence of text. In the context of text analysis or search indexing, a unigram represents an individual word without considering its relationship to other words. For example, in the sentence "1950 Buick engine restoration," each word is considered a unigram: Unigram 1: "1950" Unigram 2: "Buick" Unigram 3: "engine" Unigram 4: "restoration." A bi-gram is a sequence of two consecutive words or tokens. It captures the relationship between two adjacent words in a text, providing more context than a unigram. For example, in the same sentence "1950 Buick engine restoration," the bi-grams would be: Bi-gram 1: "1950 Buick" Bi-gram 2: "Buick engine" Bi-gram 3: "engine restoration."

Per block 806, in response to the extracting of the infrequent or rare term, some embodiments populate a first index (for example an inverted index) that associates a representation (for example a copy) of the infrequent or rare term to a representation of the first URL. In some embodiments, the first index is an inverted index that includes a key attribute and a value attribute, where the key attribute represents a plurality of terms (for example words) and the value attribute represents a plurality of URLs such that each respective word points to a respective URL associated with a respective webpage that the respective word is located in.

Subsequent to the populating of the first index, some embodiments receive a query, parse the query into a plurality of terms, and look up at least a first term, of the plurality terms of the query, in the first index. And in response to the looking up of the first term, some embodiments retrieve, from a corresponding record in the first index, a first corresponding URL that represents a search result. Some embodiments additionally extract one or more common or popular terms (unlike the first index, which stores rare terms) from at least one of a second URL, a second anchor text, or a second title. In response to the extracting of the common or popular term, some embodiments populate the first index and/or a second index that associates a representation of the second URL to a representation of the common or popular term. Some embodiments, then execute a query based at least in part on the populating of the first index and/or the second index that associates the representation of the second URL to the representation of the common or popular term. Some embodiments additionally execute the query based at least in part on merging a first URL from the first index and the second URL from the first and/or second index. And based at least in part on the merging, the query, credibility of the first URL and the second URL, and popularity of the first URL and the second URL, some embodiments rank the first URL and the second URL as search result candidates.

In other words, various embodiments merge these two sets of URLs, combining the URLs from the first index or both the first index (rare term matches) and the second index (common term matches) into a single candidate list. This process ensures that both niche and mainstream content are represented. For example, if a query contains both rare and common terms like "1950 Buick engine," the rare term index might return a specialized vintage car restoration guide, while the common term index might return links from popular automotive parts websites. The system assesses the relevance of each URL based on how well the URL matches the user's query. This includes evaluating the query terms found in the URL, the anchor text, or the page's title. URLs that match more query terms or have higher semantic relevance will be given a higher rank. Credibility or authority metrics, such as the domain reputation or the number of inbound links, are also factored into the ranking. For instance, a URL from a well-established domain like vintagecarparts.com might rank higher than a less authoritative source, even if both match the query. Popularity metrics, such as user engagement, click-through rates, or how frequently the URL is accessed or cited, are considered. More popular URLs (for example from the second index) are often ranked higher, but niche URLs (for example from the first index) can also rank highly if they are highly relevant. In some embodiments, the system uses a weighted algorithm to balance the influence of niche (from the first index) and mainstream (from the second index) content. This ensures that specialized URLs are not drowned out by more popular URLs, and both types of results are fairly represented in the search result ranking. After considering relevance, credibility, and popularity, the system assigns a final ranking score to each URL. The URLs are then ranked from highest to lowest and presented to the user, ensuring that the most relevant and authoritative results are at the top of the list.

Example Computing Architecture and Device

Figure 9:
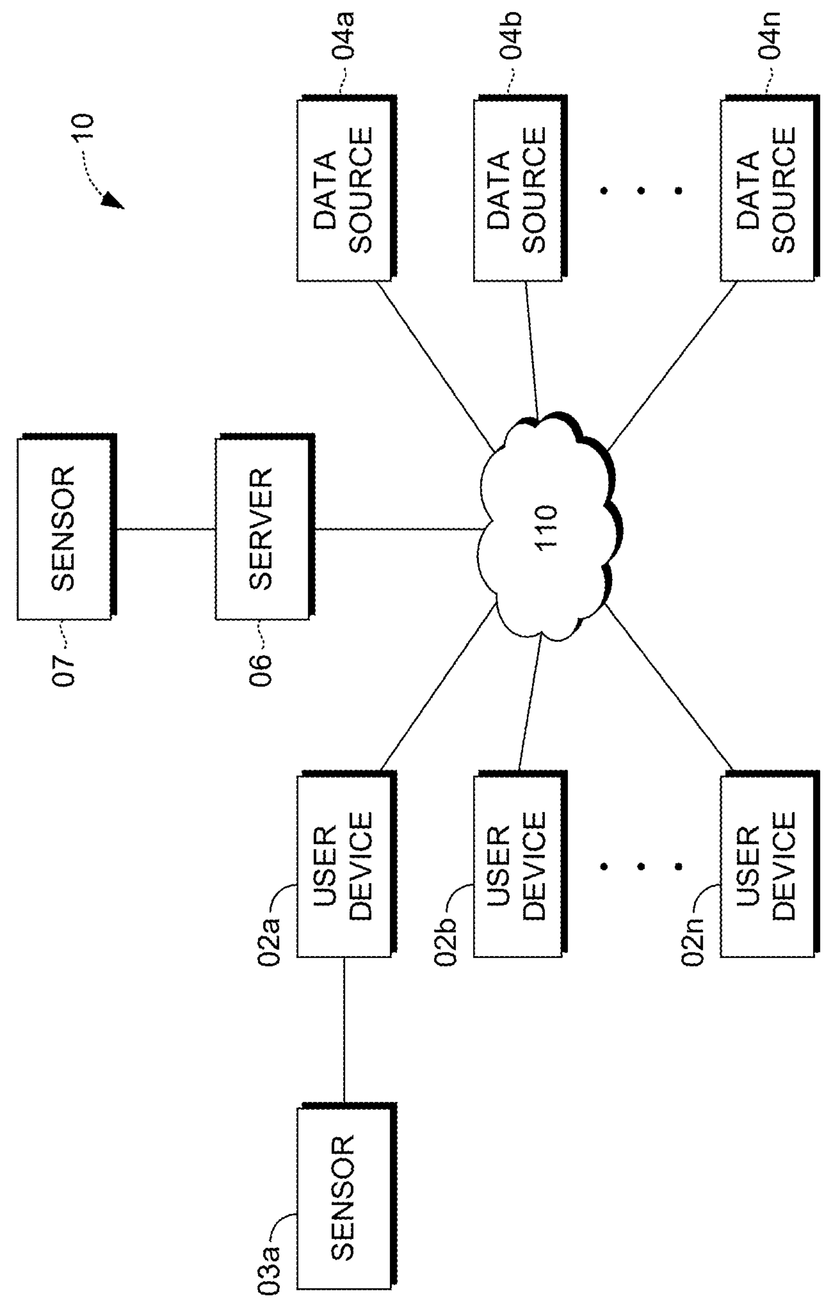
FIG. 9 is a block diagram illustrating an example operating environment suitable for implementing some embodiments of the disclosure.

Turning now to FIG. 9, a block diagram is provided showing an example operating environment 10 in which some embodiments of the present disclosure is employed. It should be understood that this and other arrangements described herein are set forth only as examples. Other arrangements and elements (for example, machines, interfaces, functions, orders, and groupings of functions) can be used in addition to or instead of those shown, and some elements are omitted altogether for the sake of clarity. Further, many of the elements described herein are functional entities that are implemented as discrete or distributed components or in conjunction with other components, and in any suitable combination and location. Various functions described herein as being performed by an entity that is carried out by hardware, firmware, and/or software. For instance, some functions are carried out by a processor executing instructions stored in memory.

Among other components not shown, example operating environment 10 includes a number of user devices, such as user devices 02*a* and 02*b* through 02*n*; a number of data sources (for example, databases or other data stores, such as 105), such as data sources 04*a* and 04*b* through 04*n*; server 06; sensors 03*a* and 07; and network(s) 110. It should be understood that environment 10 shown in FIG. 9 is an example of one suitable operating environment. Each of the components shown in FIG. 9 are implemented via any type of computing device, such as computing device 11 as described in connection to FIG. 10, for example. These components communicate with each other via network(s) 110, which includes, without limitation, a local area network (LAN) and/or a wide area networks (WAN). In some implementations, network(s) 110 comprises the Internet and/or a cellular network, amongst any of a variety of possible public and/or private networks.

It should be understood that any number of user devices, servers, and data sources are employed within operating environment 10 within the scope of the present disclosure. Each comprises a single device or multiple devices cooperating in a distributed environment. For instance, server 06 is provided via multiple devices arranged in a distributed environment that collectively provide the functionality described herein. Additionally, other components not shown are also included within the distributed environment, in some embodiments.

User devices 02*a* and 02*b* through 02*n* can be client devices on the client-side of operating environment 10, while server 06 can be on the server-side of operating environment 10. Server 06 can comprise server-side software designed to work in conjunction with client-side software on user devices 02*a* and 02*b* through 02*n* so as to implement any combination of the features and functionalities discussed in the present disclosure. This division of operating environment 10 is provided to illustrate one example of a suitable environment, and there is no requirement for each implementation that any combination of server 06 and user devices 02*a* and 02*b* through 02*n* remain as separate entities. In some embodiments, the one or more servers 06 represent one or more nodes in a cloud computing environment. Consistent with various embodiments, a cloud computing environment includes a network-based, distributed data processing system that provides one or more cloud computing services. Further, a cloud computing environment can include many computers, hundreds or thousands of them or more, disposed within one or more data centers and configured to share resources over the one or more network(s) 110.

In some embodiments, a user device 02*a* or server 06 alternatively or additionally comprises one or more web servers and/or application servers to facilitate delivering web or online content to browsers installed on a user device 02*b*. Often the content can include static content and dynamic content. When a client application, such as a web browser, requests a website or web application via a URL or search term, the browser typically contacts a web server to request static content or the basic components of a website or web application (for example, HTML pages, image files, video files, and the like). Application servers typically deliver any dynamic portions of web applications or business logic portions of web applications. Business logic can be described as functionality that manages communication between a user device and a data store (for example, a database). Such functionality can include business rules or workflows (for example, code that indicates conditional if/then statements, while statements, and the like to denote an order of processes).

User devices 02*a* and 02*b* through 02*n* comprises any type of computing device capable of use by a user. For example, in one embodiment, user devices 02*a* through 02*n* is the type of computing device described in relation to FIG. 10 herein. By way of example and not limitation, a user device is embodied as a personal computer (PC), a laptop computer, a mobile phone or mobile device, a smartphone, a tablet computer, a smart watch, a wearable computer, a personal digital assistant (PDA), a music player or an MP3 player, a global positioning system (GPS) or device, a video player, a handheld communications device, a gaming device or system, an entertainment system, a vehicle computer system, an embedded system controller, a camera, a remote control, a bar code scanner, a computerized measuring device, an appliance, a consumer electronic device, a workstation, or any combination of these delineated devices, or any other suitable computer device.

Data sources 04*a* and 04*b* through 04*n* comprises data sources and/or data systems, which are configured to make data available to any of the various constituents of operating environment 10 or system 100 described in connection to FIG. 1. Examples of data source(s) 04*a* through 04*n* is one or more of a database, a file, data structure, corpus, or other data store. Data sources 04*a* and 04*b* through 04*n* are discrete from user devices 02*a* and 02*b* through 02*n* and server 06 or is incorporated and/or integrated into at least one of those components in some embodiments. In one embodiment, data sources 04*a* through 04*n* comprise sensors (such as sensors 03*a* and 07), which is integrated into or associated with the user device(s) 02*a*, 02*b*, or 02*n* or server 06 in some embodiments.

In some embodiments, operating environment 9 is utilized to implement one or more of the components of the system 100, described in FIG. 1, including components for assigning one or more datasets to one or more clusters, as described herein. Operating environment 10 also can be utilized for implementing aspects of processes 700 and 800 and/or any other functionality as described in connection with FIGS. 1-9.

Figure 10:
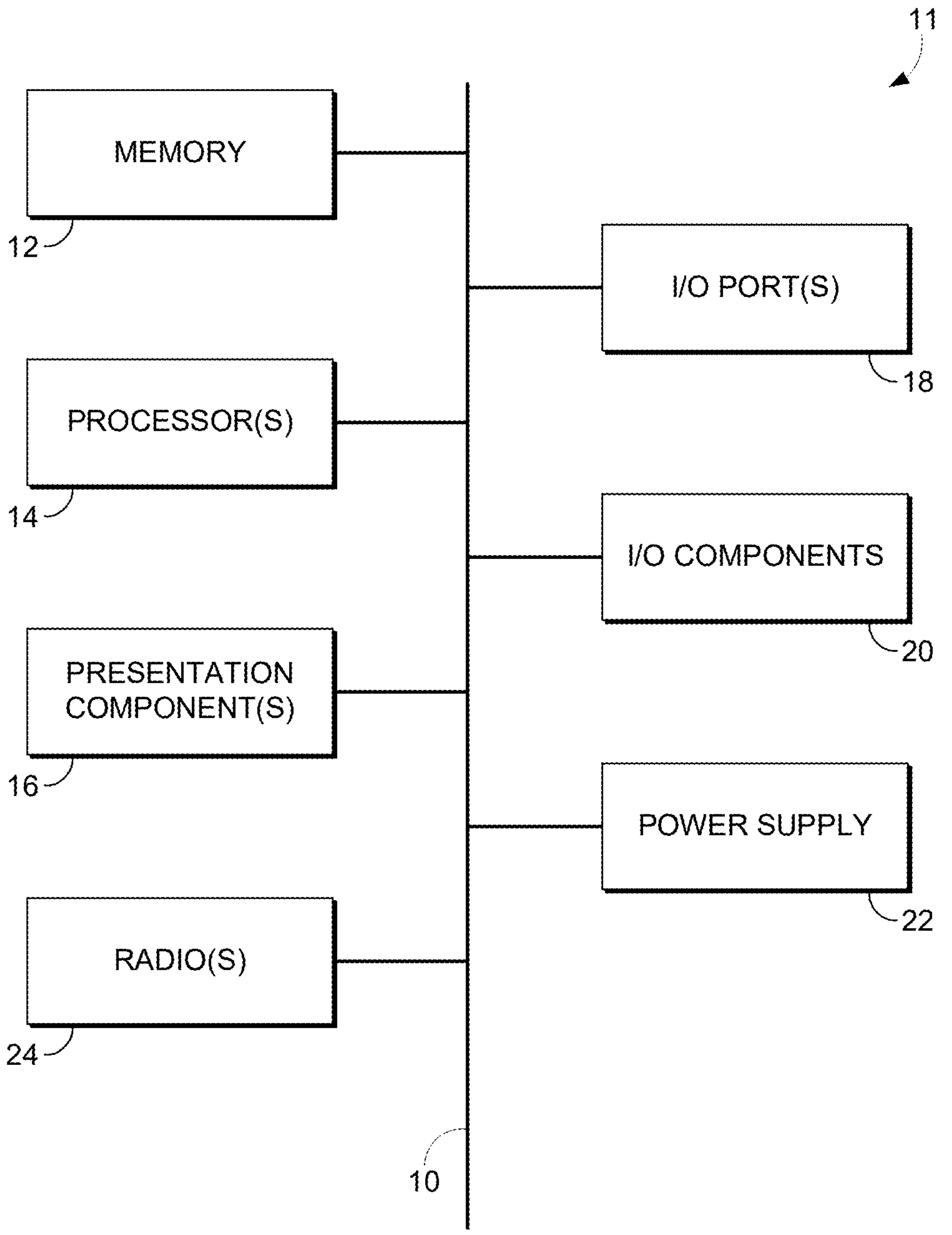
FIG. 10 is a block diagram of an example computing device suitable for use in implementing some embodiments described herein.

Having described various implementations, an exemplary computing environment suitable for implementing embodiments of the disclosure is now described. With reference to FIG. 10, an exemplary computing device is provided and referred to generally as computing device 11. The computing device 11 is but one example of a suitable computing environment and is not intended to suggest any limitation as to the scope of use or functionality of embodiments of the disclosure. Neither should the computing device 11 be interpreted as having any dependency or requirement relating to any one or combination of components illustrated.

Turning to FIG. 10, computing device 11 includes a bus 19 that directly or indirectly couples the following devices: memory 12, one or more processors 14, one or more presentation components 16, one or more input/output (I/O) ports 18, one or more I/O components 20, an illustrative power supply 22, and a hardware accelerator 26. Bus 19 represents what can be one or more busses (such as an address bus, data bus, or combination thereof). Although the various blocks of FIG. 10 are shown with lines for the sake of clarity, in reality, these blocks represent logical, not necessarily actual, components. For example, one can consider a presentation component such as a display device to be an I/O component. Also, processors have memory. The inventors hereof recognize that such is the nature of the art and reiterate that the diagram of FIG. 10 is merely illustrative of an exemplary computing device that can be used in connection with one or more embodiments of the present disclosure. Distinction is not made between such categories as "workstation," "server," "laptop," "handheld device," or other computing device, as all are contemplated within the scope of FIG. 10 and with reference to "computing device."

Computing device 11 typically includes a variety of computer-readable media. Computer-readable media can be any available media that can be accessed by computing device 11 and includes both volatile and nonvolatile media, removable and non-removable media. By way of example, and not limitation, computer-readable media comprises computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 11. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 12 includes computer storage media in the form of volatile and/or nonvolatile memory. The memory is removable, non-removable, or a combination thereof. Exemplary hardware devices include solid-state memory, hard drives, optical-disc drives, or other hardware. Computing device 11 includes one or more processors 14 that read data from various entities such as memory 12 or I/O components 20. Presentation component(s) 16 presents data indications to a user or other device. Exemplary presentation components include a display device, speaker, printing component, vibrating component, and the like.

The I/O ports 18 allow computing device 11 to be logically coupled to other devices, including I/O components 20, some of which are built-in, in some instances. Illustrative components include a microphone, joystick, game pad, satellite dish, scanner, printer, wireless device, and the like. The I/O components 20 provide a natural user interface (NUI) that processes air gestures, voice, or other physiological inputs generated by a user in some embodiments. In some instances, inputs are transmitted to an appropriate network element for further processing. An NUI can implement any combination of speech recognition, touch and stylus recognition, facial recognition, biometric recognition, gesture recognition both on screen and adjacent to the screen, air gestures, head and eye tracking, and touch recognition associated with displays on the computing device 11. The computing device 11 can be equipped with depth cameras, such as stereoscopic camera systems, infrared camera systems, RGB camera systems, and combinations of these, for gesture detection and recognition. Additionally, the computing device 11 can be equipped with accelerometers or gyroscopes that enable detection of motion. The output of the accelerometers or gyroscopes can be provided to the display of the computing device 11 to render immersive augmented reality or virtual reality.

Some embodiments of computing device 11 include one or more radio(s) 24 (or similar wireless communication components). The radio 24 transmits and receives radio or wireless communications. The computing device 11 can be a wireless terminal adapted to receive communications and media over various wireless networks. Computing device 11 can communicate via wireless protocols, such as code division multiple access ("CDMA"), global system for mobiles ("GSM"), or time division multiple access ("TDMA"), as well as others, to communicate with other devices. The radio communications can be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection can include, by way of example and not limitation, a Wi-Fi® connection to a device (for example, mobile hotspot) that provides access to a wireless communications network, such as a WLAN connection using the 802.11 protocol, a Bluetooth connection to another computing device is a second example of a short-range connection, or a near-field communication connection. A long-range connection can include a connection using, by way of example and not limitation, one or more of CDMA, GPRS, GSM, TDMA, and 802.16 protocols.

Hardware accelerator 26 represents any suitable hardware component (for example GPU) that offloads one or more tasks (for example from a CPU) to accelerate or speed up the task. In some embodiments, the hardware accelerator 26 represents a Graphics Processing Unit (GPU), field programmable gate arrays (FPGA), application-specific integrated circuits (ASIC), a Tensor Processing Unit (TPU), a sound card, or any suitable hardware component.

OTHER EMBODIMENTS

In some embodiments, a system, such as the computerized system described in any of the embodiments above, comprise at least one computer processor, one or more computer storage media storing computer-useable instructions that, when used by the at least one computer processor, cause the at least one computer processor to perform operations comprising: crawling a computer network by at least collecting a first Uniform Resource Locator (URL) corresponding to an address or location of a first webpage; extracting an infrequent or rare term from at least one of the first URL, an anchor text, or a title, the anchor text being clickable text on a second webpage that links to the first URL, the title being a main heading or label for the first or second webpage; in response to the extracting of the infrequent or rare term, populating a first index that associates a representation of the infrequent or rare term to a representation of the first URL; and based at least in part on the populating of the first index that associates the representation of the infrequent or rare term to the representation of the first URL, executing a query by returning at least one search result.

Advantageously, these and other embodiments of the system have the technical effects of at least reduced error rate, reduced computing consumption (for example, memory, I/O, latency, bandwidth), enhanced reliability, and/or simplifying the software development process, as described in more detail herein.

In any combination of the above embodiments of the system, the extracting of the infrequent or rare term is based at least in part on computing a frequency with which each unigram or bi-gram appears across a plurality of collected URLs, a plurality of anchor texts, and a plurality of titles, and determining whether the frequency is below a threshold, the plurality of collected URLs includes the first URL, the plurality of anchor texts includes the anchor text, and the plurality of titles includes the title.

In any combination of the above embodiments of the system, the first index is an inverted index that includes a key attribute and a value attribute, and wherein the key attribute represents a plurality of infrequent or rare words and the value attribute represents a plurality of URLs such that each respective infrequent or rare word points to a respective URL associated with a respective webpage that the respective infrequent or rare word is located in.

In any combination of the above embodiments of the system, the executing of the query is based at least in part on: parsing the query into a plurality of terms; looking up at least a first term, of the plurality of terms of the query, in the first index; and in response to the looking up of the first term, retrieving, from a corresponding record in the first index, a first corresponding URL that represents the search result.

In any combination of the above embodiments of the system, the operations further comprise: extracting a common or popular term from at least one of a second URL, a second anchor text, or a second title; and in response to the extracting of the common or popular term, populating the first index or a second index that associates a representation of the second URL to a representation of the common or popular term, wherein the executing of the query is further based at least in part on the populating of the first index or second index that associates the representation of the second URL to the representation of the common or popular term.

In any combination of the above embodiments of the system, the executing of the query is further based at least in part on: merging a first URL from the first index and a second URL from the first index or second index; and based at least in part on the merging, the query, credibility of the first URL and the second URL, and popularity of the first URL and the second URL, ranking the first URL and the second URL as search result candidates.

In any combination of the above embodiments of the system, the operations further comprise: looking up at least a second term, of the plurality terms of the query, in the first index or second index; and in response to the looking up of the second term, retrieving, from a corresponding record in the first index or the second index, a second corresponding URL that represents a second search result for the query.

In some embodiments, a computer-implemented method comprises: collecting a first Uniform Resource Locator (URL) corresponding to an address or location of a first webpage; extracting an infrequent or rare term from at least one of the first URL, an anchor text, or a title, the anchor text being clickable text on a second webpage that links to the first URL, the title being a main heading or label for the first webpage; and in response to the extracting of the infrequent or rare term, populating a first index that associates a representation of the infrequent or rare term to a representation of the first URL.

Advantageously, these and other embodiments of the computer-implemented method have the technical effects of at least reduced error rate, reduced computing consumption (for example, memory, I/O, latency, bandwidth), enhanced reliability, and/or simplifying the software development process, as described in more detail herein.

In any combination of the above embodiments of the computer-implemented method, the extracting of the infrequent or rare term is based at least in part on computing a frequency with which each unigram or bi-gram appears across a plurality collected URLs, a plurality of anchor texts, and a plurality of titles, and determining whether the frequency is below a threshold, the plurality of collected URLs includes the first URL, the plurality of anchor texts includes the anchor text, and the plurality of titles includes the title.

In any combination of the above embodiments of the computer-implemented method, the first index is an inverted index that includes a key attribute and a value attribute, and wherein the key attribute represents a plurality of words and the value attribute represents a plurality of URLs such that each respective word points to a respective URL associated with a respective webpage that the respective word is located in.

In any combination of the above embodiments of the computer-implemented method, the method further comprises: subsequent to the populating of the first index, receiving a query; parsing the query into a plurality of terms; looking up at least a first term, of the plurality terms of the query, in the first index; and in response to the looking up of the first term, retrieving, from a corresponding record in the first index, a first corresponding URL that represents a search result.

In any combination of the above embodiments of the computer-implemented method, the method further comprises: extracting a common or popular term from at least one of a second URL, a second anchor text, or a second title; in response to the extracting of the common or popular term, populating the first index or a second index that associates a representation of the second URL to a representation of the common or popular term; and executing a query based at least in part on the populating of the first index or a second index that associates the representation of the second URL to the representation of the common or popular term.

In any combination of the above embodiments of the computer-implemented method, the method further comprises: executing a query based at least in part on: merging a first URL from the first index and the second URL from the first index or the second index; and based at least in part on the merging, the query, credibility of the first URL and the second URL, and popularity of the first URL and the second URL, ranking the first URL and the second URL as search result candidates.

In any combination of the above embodiments of the computer-implemented method, the method further comprises: looking up at least a second term, of the plurality terms of the query, in the first index or the second index; and in response to the looking up of the second term, retrieving, from a corresponding record in the first index or the second index, a second corresponding URL that represents a second search result for the query.

In some embodiments, one or more computer storage media have computer-executable instructions embodied thereon that, when executed, by one or more processors, cause the one or more processors to perform operations comprising the following operations. receiving a query; parsing the query into a plurality of terms; searching, in a first index, for a representation of a first term, of the plurality of terms of the query, the first index only including a set of rare or infrequent terms; searching, in the first index or a second index, for a representation of a second term, of the plurality of terms of the query, the second term being a common or popular term, the second index only including a set of common or popular terms; and based at least in part on the searching for the representation of the first term and the representation of the second term, retrieving, from a corresponding record in at least one of the first index or the second index, a corresponding Uniform Resource Locator (URL) that represents a search result.

Advantageously, these and other embodiments of the one or more computer storage media method have the technical effects of at least reduced error rate, reduced computing consumption (for example, memory, I/O, latency, bandwidth), enhanced reliability, and/or simplifying the software development process, as described in more detail herein.

In any combination of the above embodiments of the one or more computer storage media, the set of infrequent or rare term is determined based at least in part on computing a frequency with which each unigram or bi-gram appears across a plurality of collected URLs, a plurality of anchor texts, and an a plurality of titles, and determining whether the frequency is below a threshold, the plurality of collected URLs includes the first URL, the plurality of anchor texts includes the anchor text, and the plurality of titles includes the title.

In any combination of the above embodiments of the one or more computer storage media, the first index is an inverted index that includes a key attribute and a value attribute, and wherein the key attribute represents a plurality of infrequent or rare words and the value attribute represents a plurality of URLs such that each respective infrequent or rare word points to a respective URL associated with a respective webpage that the respective infrequent or rare word is located in.

In any combination of the above embodiments of the one or more computer storage media, the operations further comprising executing query based at least in part on: merging a first URL from the first index and a second URL from the second index; and based at least in part on the merging, the query, credibility of the first URL and the second URL, and popularity of the first URL and the second URL, ranking the first URL and the second URL as search result candidates.

In any combination of the above embodiments of the one or more computer storage media, the operations further comprising: prior to the receiving of the query, crawling a computer network by at least collecting a plurality of URLs corresponding to addresses or locations of a plurality of webpages; and building the first index by: extracting infrequent or rare terms from at least one of the plurality of URLS, an anchor text, or a title; and in response to the extracting of the infrequent or rare terms, generating the first index that associates a representation of the infrequent or rare terms to a representation of corresponding URLs.

In any combination of the above embodiments of the one or more computer storage media, at least one of the first index or the second index stores 4 or more terabytes of data.

In some embodiments, a system, such as the computerized system described in any of the embodiments above, comprise at least one computer processor, one or more computer storage media storing computer-useable instructions that, when used by the at least one computer processor, cause the at least one computer processor to perform operations comprising: receiving a query; in response to the receiving of the query, providing at least the query as input into a model, wherein the model generates a first Uniform Resource Locator (URL) candidate based at least in part on the query; based at least in part on receiving the first URL candidate generated by the model, storing content associated with the first URL candidate in an index; and based at least in part on the storing of the content associated with the first URL candidate in the index, at least partially causing the query to be executed by fetching the content and causing presentation, at a user device, of the content.

Advantageously, these and other embodiments of the system have the technical effects of at least reduced error rate, reduced computing consumption (for example, memory, I/O, latency, bandwidth), enhanced reliability, and/or simplifying the software development process, as described in more detail herein.

In any combination of the above embodiments of the system, the operations further comprising: based at least in part on the query, generating a set of tags that represent likely content topics related to the query; matching the set of tags against pre-generated tags associated with each site, of a plurality of sites; and based on a site with a highest score of matching tags, generating a second URL candidate by populating a URL template, the URL template includes a predefined structure or pattern for a respective URL.

In any combination of the above embodiments of the system, the operations further comprising: providing contextual data that includes at least one of location data or market data as second input into the model, wherein the model generates the candidate URL based further on the contextual data.

In any combination of the above embodiments of the system, the operations further comprising: instructing a web crawler to collect a plurality of URLs from a plurality of websites, each URL, of the plurality of URLs including a variable part; identifying a common structure or pattern within the plurality of URLs; grouping each URL, of the plurality of URLs, into a respective cluster based at least in part on the common structure or pattern; and based at least in part on the grouping, generating the URL template by at least replacing the variable part of a respective URL with a placeholder.

In any combination of the above embodiments of the system, the operations further comprising: associating a URL template with metadata that describes at least one of: usage, type of content the URL template retrieves, or a website or category the URL template applies to.

In any combination of the above embodiments of the system, the operations further comprising: causing a first crawl starting with a seed, the seed corresponding to the first URL candidate; during the first crawl, detecting a first plurality of new URLs linked from the seed that are relevant to the query; in response to the detecting of the first plurality of new URLs, fetching second content from the first plurality of new URLs; and in response to the fetching of the content, storing the second content and the first plurality of new URLs to the index, wherein the at least partially executing the query is further based at least in part on the storing of the second content and the first plurality of new URLs to the index.

In any combination of the above embodiments of the system, the operations further comprising: ranking, using the model, the first plurality of new URLs based on at least one of the query, the first plurality of new URLs, or a title of a linked page.

In any combination of the above embodiments of the system, the operations further comprising: instructing at least a second crawl of a portion of the first plurality of new URLs based at least in part on the ranking; during the second crawl, detecting a second plurality of new URLs linked from the portion that are relevant to the query; in response to the detecting of the second plurality of new URLs, fetching third content from the second plurality of new URLs; and in response to the fetching of the third content, updating the index with the third content, wherein the at least partially executing the query is further based at least in part on the updating of the index with the third content.

In any combination of the above embodiments of the system, the operations further comprising: during the first crawl, identifying and eliminating deadlinks; and removing duplicate URLs and content.

In some embodiments, a computer-implemented method, such as described in any of the processes or embodiments above, comprises: receiving a query; in response to the receiving of the query, generating a first URL candidate; determining that the first URL candidate is valid based at least in part on using a URL template, the URL template includes a predefined structure or pattern for a respective URL; based at least in part on the determining that the first URL candidate is valid, storing content associated with the first URL candidate to an index by instructing a first crawl; and based at least in part on the storing of the content to the index, at least partially executing the query by fetching the content and causing presentation, at a user device, of the content.

Advantageously, these and other embodiments of the computer-implemented method have the technical effects of at least reduced error rate, reduced computing consumption (for example, memory, I/O, latency, bandwidth), enhanced reliability, and/or simplifying the software development process, as described in more detail herein.

In any combination of the above embodiments of the computer-implemented method, the determining that the first URL candidate is valid is based on: comparing the first URL candidate against the URL template; based at least on the comparing, generating a score indicating how closely a structure of the URL candidate matches the URL template; and based at least in part on the score meeting or exceeding a threshold, determining that the first URL candidate is valid.

In any combination of the above embodiments of the computer-implemented method, the generation of the first URL candidate is based at least in part on providing at least the query as input into a model, wherein the model generates the first URL candidate based at least in part on the query.

In any combination of the above embodiments of the computer-implemented method, the generation of the first URL candidate includes: based at least in part on the query, generating a set of tags that represent likely content topics related to the query; matching the set of tags against pre-generated tags associated with each site, of a plurality of sites; and based on a site with a highest quantity of matching tags, generating the first URL candidate by populating the URL template.

In any combination of the above embodiments of the computer-implemented method, the method further comprises: instructing a first crawl starting with a seed, the seed corresponding to the first URL candidate; during the first crawl, detecting a first plurality of new URLs linked from the seed that are relevant to the query; in response to the detecting of the first plurality of new URLs, fetching second content from the first plurality of new URLs; and in response to the fetching of the second content, storing the second content and the first plurality of new URL to the index, wherein the at least partially executing the query is further based at least in part on the storing of the second content and the first plurality of new URLs to the index.

In any combination of the above embodiments of the computer-implemented method, the method further comprises: ranking, using a model, the first plurality of new URLs based on at least one of the query, the first plurality of new URLs, or a title of a linked page.

In any combination of the above embodiments of the computer-implemented method, the method further comprises: instructing at least a second crawl of a portion of the first plurality of new URLs based at least in part on the ranking; during the second crawl, detecting a second plurality of new URLs linked from the portion that are relevant to the query; in response to the detecting of the second plurality of new URLs, fetching third content from the second plurality of new URLs; and in response to the fetching of the third content, updating the index with the third content, wherein the at least partially executing the query is further based at least in part on the updating of the index with the third content.

In any combination of the above embodiments of the computer-implemented method, the method further comprises: during the first crawl, identifying and eliminating deadlinks; and removing duplicate URLs and respective content.

In some embodiments, one or more computer storage media, such as any computer storage media described in any of the embodiments above, has computer-executable instructions embodied thereon that, when executed, by one or more processors, cause the one or more processors to perform operations comprising: receiving a query; in response to the receiving of the query, instructing a first crawl starting with a seed; during the first crawl, detecting a first URL linked from the seed that is relevant to the query; in response to the detecting of the first URL, fetching content via the first URL; in response to the fetching of the content, storing the content and the first URL to an index; and based at least in part on the storing of the content and the first URL to the index, at least partially executing the query.

Advantageously, these and other embodiments of the one or more computer storage media have the technical effects of at least reduced error rate, reduced computing consumption (for example, memory, I/O, latency, bandwidth), enhanced reliability, and/or simplifying the software development process, as described in more detail herein.

In any combination of the above embodiments of the one or more computer storage media, the operations further comprising: further executing the query by ranking, using a model, the first URL among a second set of URLs, based on at least one of the query, the second set of URLs, or a title of a linked page.

In any combination of the above embodiments of the one or more computer storage media, the operations further comprising: instructing at least a second crawl of the first URL based at least in part on the ranking; during the second crawl, detecting a second URL linked from the first URL; in response to the detecting of the second URL, fetching second content from the second URL; and in response to the fetching of the second content, updating the index with the second content, wherein the at least partially executing the query is further based at least in part on the updating of the index with the second content.

Additional Structural and Functional Features of Embodiments of Technical Solution Having identified various components utilized herein, it should be understood that any number of components and arrangements can be employed to achieve the desired functionality within the scope of the present disclosure. For example, the components in the embodiments depicted in the figures are shown with lines for the sake of conceptual clarity. Other arrangements of these and other components can also be implemented. For example, although some components are depicted as single components, many of the elements described herein can be implemented as discrete or distributed components or in conjunction with other components, and in any suitable combination and location. Some elements can be omitted altogether. Moreover, various functions described herein as being performed by one or more entities is carried out by hardware, firmware, and/or software, as described below. For instance, various functions are carried out by a processor executing instructions stored in memory. As such, other arrangements and elements (for example, machines, interfaces, functions, orders, and groupings of functions, and the like.) can be used in addition to or instead of those shown.

Embodiments of the present disclosure have been described with the intent to be illustrative rather than restrictive. Embodiments described in the paragraphs above can be combined with one or more of the specifically described alternatives. In particular, an embodiment that is claimed can contain a reference, in the alternative, to more than one other embodiment. The embodiment that is claimed can specify a further limitation of the subject matter claimed. Alternative embodiments will become apparent to readers of this disclosure after and because of reading it. Alternative means of implementing the aforementioned can be completed without departing from the scope of the claims below. Certain features and sub-combinations are of utility and can be employed without reference to other features and sub-combinations and are contemplated within the scope of the claims.

As used herein, the term "set" is employed to refer to an ordered (i.e., sequential) or an unordered (i.e., non-sequential) collection of objects (or elements), such as but not limited to data elements (for example, events, clusters of events, and the like). A set includes N elements, where N is any non-negative integer. That is, a set includes 1, 2, 3, N objects and/or elements, where N is a positive integer with no upper bound. Therefore, as used herein, a set can include only a single element. In other embodiments, a set includes a number of elements that is significantly greater than one, two, or three elements. As used herein, the term "subset," is a set that is included in another set. A subset can be, but is not required to be, a proper or strict subset of the other set that the subset is included in. That is, if set B is a subset of set A, then in some embodiments, set B is a proper or strict subset of set A. In other embodiments, set B is a subset of set A, but not a proper or a strict subset of set A.

The invention claimed is:

1. A system comprising:
at least one computer processor; and
one or more computer storage media storing computer-useable instructions that, when used by the at least one computer processor, cause the at least one computer processor to perform operations comprising:
crawling a computer network by at least collecting a first Uniform Resource Locator (URL) corresponding to an address or location of a first webpage;
extracting, from at least one of the first URL, an anchor text, or a title, a word or phrase identified as an infrequent or rare term based at least in part on the word or phrase appearing less frequently than other terms across a dataset of webpages, the anchor text being clickable text on a second webpage that links to the first URL, the title being a main heading or label for the first or second webpage;

in response to the extracting of the word or phrase identified as the infrequent or rare term based at least in part on the word or phrase appearing less frequently than other terms across a dataset of webpages, populating a first index that associates a representation of the infrequent or rare term to a representation of the first URL; and based at least in part on the populating of the first index that associates the representation of the infrequent or rare term to the representation of the first URL, executing a query by returning at least one search result.

2. The system of claim 1, wherein the extracting of the word or phrase identified as an infrequent or rare term is based at least in part on computing, for each unigram or bi-gram, a frequency of occurrence across a plurality of collected URLs, a plurality of anchor texts, and a plurality of titles, and determining whether the frequency of occurrence is below a threshold, the plurality of collected URLs includes the first URL, the plurality of anchor texts includes the anchor text, and the plurality of titles includes the title.

3. The system of claim 1, wherein the first index is an inverted index that includes a key attribute and a value attribute, and wherein the key attribute represents a plurality of infrequent or rare words and the value attribute represents a plurality of URLs such that each respective infrequent or rare word points to a respective URL associated with a respective webpage that the respective infrequent or rare word is located in.

4. The system of claim 1, wherein the executing of the query is based at least in part on:

parsing the query into a plurality of terms;

looking up at least a first term, of the plurality of terms of the query, in the first index; and in response to the looking up of the first term, retrieving, from a corresponding record in the first index, a first corresponding URL that represents the search result.

5. The system of claim 1, wherein the operations further comprising:

extracting a common or popular term from at least one of a second URL, a second anchor text, or a second title; and in response to the extracting of the common or popular term, populating the first index or a second index that associates a representation of the second URL to a representation of the common or popular term, wherein the executing of the query is further based at least in part on the populating of the first index or second index that associates the representation of the second URL to the representation of the common or popular term.

6. The system of claim 5, wherein the executing of the query is further based at least in part on:

merging a first URL from the first index and a second URL from the first index or second index; and based at least in part on the merging, the query, credibility of the first URL and the second URL, and popularity of the first URL and the second URL, ranking the first URL and the second URL as search result candidates.

7. The system of claim 5, wherein the operations further comprising:

looking up at least a second term, of the plurality terms of the query, in the first index or second index; and in response to the looking up of the second term, retrieving, from a corresponding record in the first index or the second index, a second corresponding URL that represents a second search result for the query.

8. A computer-implemented method comprising:

collecting a first Uniform Resource Locator (URL) corresponding to an address or location of a first webpage;

extracting, from at least one of the first URL, an anchor text, or a title, a word or phrase identified as an infrequent or rare term based at least in part on the word or phrase appearing less frequently than other terms across a dataset of webpages, the anchor text being clickable text on a second webpage that links to the first URL, the title being a main heading or label for the first webpage; and in response to the extracting of the word or phrase identified as the infrequent or rare term based at least in part on the word or phrase appearing less frequently than other terms across a dataset of webpages, populating a first index that associates a representation of the infrequent or rare term to a representation of the first URL.

9. The computer-implemented method of claim 8, wherein the extracting of the infrequent or rare term is based at least in part on computing a frequency with which each unigram or bi-gram appears across a plurality collected URLs, a plurality of anchor texts, and a plurality of titles, and determining whether the frequency is below a threshold, the plurality of collected URLs includes the first URL, the plurality of anchor texts includes the anchor text, and the plurality of titles includes the title.

10. The computer-implemented method of claim 8, wherein the first index is an inverted index that includes a key attribute and a value attribute, and wherein the key attribute represents a plurality of words and the value attribute represents a plurality of URLs such that each respective word points to a respective URL associated with a respective webpage that the respective word is located in.

11. The computer-implemented method of claim 8, further comprising:

subsequent to the populating of the first index, receiving a query;

parsing the query into a plurality of terms;

looking up at least a first term, of the plurality terms of the query, in the first index; and in response to the looking up of the first term, retrieving, from a corresponding record in the first index, a first corresponding URL that represents a search result.

12. The computer-implemented method of claim 8, further comprising:

extracting a common or popular term from at least one of a second URL, a second anchor text, or a second title;

in response to the extracting of the common or popular term, populating the first index or a second index that associates a representation of the second URL to a representation of the common or popular term; and executing a query based at least in part on the populating of the first index or a second index that associates the representation of the second URL to the representation of the common or popular term.

13. The computer-implemented method of claim 12, further comprising:

executing a query based at least in part on:

merging a first URL from the first index and the second URL from the first index or the second index; and based at least in part on the merging, the query, credibility of the first URL and the second URL, and popularity of the first URL and the second URL, ranking the first URL and the second URL as search result candidates.

14. The computer-implemented method of claim 12, further comprising:

looking up at least a second term, of the plurality terms of the query, in the first index or the second index; and in response to the looking up of the second term, retrieving, from a corresponding record in the first index or the second index, a second corresponding URL that represents a second search result for the query.

15. One or more computer storage media having computer-executable instructions embodied thereon that, when executed, by one or more processors, cause the one or more processors to perform operations comprising:

receiving a query;

parsing the query into a plurality of terms;

searching, in a first index, for a representation of a first term, of the plurality of terms of the query, the first index only including a set of rare or infrequent terms;

searching, in the first index or a second index, for a representation of a second term, of the plurality of terms of the query, the second term being a common or popular term, the second index only including a set of common or popular terms; and based at least in part on the searching for the representation of the first term and the representation of the second term, retrieving, from a corresponding record in at least one of the first index or the second index, a corresponding Uniform Resource Locator (URL) that represents a search result.

16. The one or more computer storage media of claim 15, wherein the set of infrequent or rare term is determined based at least in part on computing a frequency with which each unigram or bi-gram appears across a plurality of collected URLs, a plurality of anchor texts, and an a plurality of titles, and determining whether the frequency is below a threshold, the plurality of collected URLs includes the first URL, the plurality of anchor texts includes the anchor text, and the plurality of titles includes the title.

17. The one or more computer storage media of claim 15, wherein the first index is an inverted index that includes a key attribute and a value attribute, and wherein the key attribute represents a plurality of infrequent or rare words and the value attribute represents a plurality of URLs such that each respective infrequent or rare word points to a respective URL associated with a respective webpage that the respective infrequent or rare word is located in.

18. The one or more computer storage media of claim 15, wherein the operations further comprising executing query based at least in part on:

merging a first URL from the first index and a second URL from the second index; and based at least in part on the merging, the query, credibility of the first URL and the second URL, and popularity of the first URL and the second URL, ranking the first URL and the second URL as search result candidates.

19. The one or more computer storage media of claim 15, wherein the operations further comprising:

prior to the receiving of the query, crawling a computer network by at least collecting a plurality of URLs corresponding to addresses or locations of a plurality of webpages; and building the first index by:

extracting infrequent or rare terms from at least one of the plurality of URLS, an anchor text, or a title; and in response to the extracting of the infrequent or rare terms, generating the first index that associates a representation of the infrequent or rare terms to a representation of corresponding URLs.

20. The one or more computer storage media of claim 15, wherein at least one of the first index or the second index stores 4 or more terabytes of data.

* * * * *